United States Patent [19]
Hartung et al.

[11] Patent Number: 4,583,166
[45] Date of Patent: Apr. 15, 1986

[54] ROLL MODE FOR CACHED DATA STORAGE

[75] Inventors: Michael H. Hartung; Arthur H. Nolta; David G. Reed, all of Tucson, Ariz.

[73] Assignee: International Business Machines Corporation, Armonk, N.Y.

[21] Appl. No.: 433,599

[22] Filed: Oct. 8, 1982

[51] Int. Cl.[4] .............................................. G06F 13/00
[52] U.S. Cl. ..................................... 364/200; 364/900
[58] Field of Search ... 364/200 MS File, 900 MS File

[56] References Cited

U.S. PATENT DOCUMENTS

| | | | |
|---|---|---|---|
| 3,569,938 | 3/1971 | Eden et al. | 364/200 |
| 3,588,839 | 6/1971 | Belady et al. | 364/200 |
| 4,198,699 | 4/1980 | Caddell | 365/230 |
| 4,262,332 | 4/1981 | Bass et al. | 364/200 |
| 4,403,288 | 9/1983 | Christian et al. | 364/200 |
| 4,430,701 | 2/1984 | Christian et al. | 364/200 |

OTHER PUBLICATIONS

IBM Technical Newsletter, GN26-0351, Nov. 15, 1979, pp. 79, 80.

IBM Technical Disclosure Bulletin, May 1982, pp. 6605, 6606.
IBM Manual, "Type 7612 Disksynchronizer for Type 7303 Disk File", pp. 14, 15, circa 1960.
IBM Technical Disclosure Bulletin, Jun. 1970, pp. 93–95.
IBM Technical Disclosure Bulletin; Nov. 1969, pp. 815–817.

*Primary Examiner*—James R. Hoffman
*Attorney, Agent, or Firm*—H. F. Somermeyer

[57] ABSTRACT

A so-called "roll mode" technique provides block transfer with a disk-type of direct-access data-storage device (DASD). A set of chained commands for accessing record areas enables rapidly accessing a plurality of records within a given DASD cylinder of tracks. The rotational position of the surfaces is checked. The command within the chain, irrespective of its location, having the closest logical rotational proximity to the instant rotational position of the surfaces is selected as the first command in the chain. The chain is executed beginning at the indicated rotational position selected command through the end of the chain and then wrapped to the beginning of the original chain and continuing on until the command immediately preceding the rotational position selected command has been executed.

17 Claims, 15 Drawing Figures

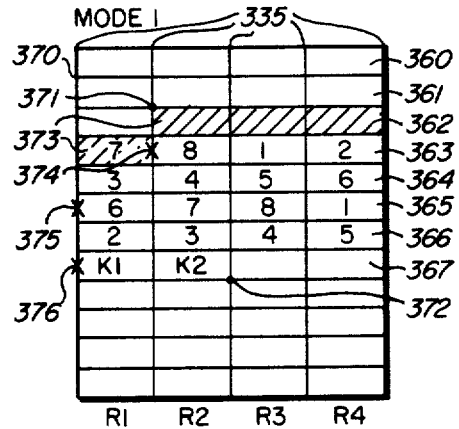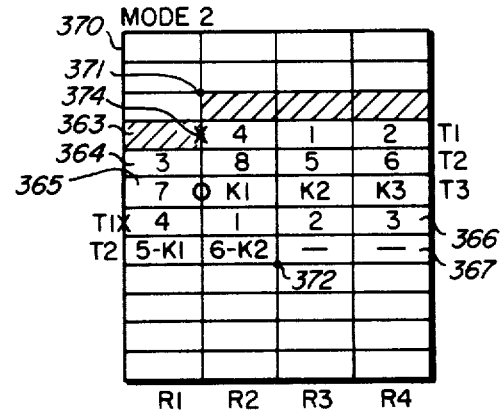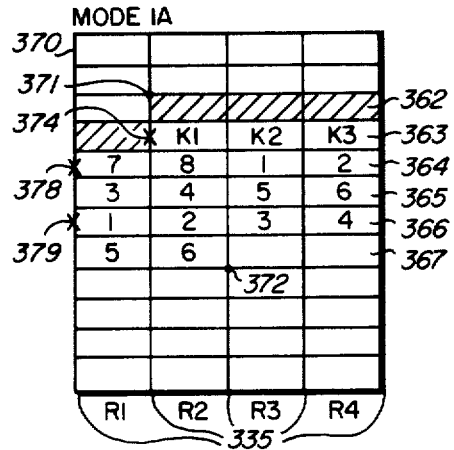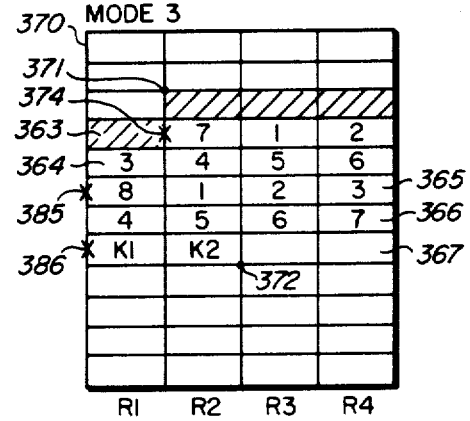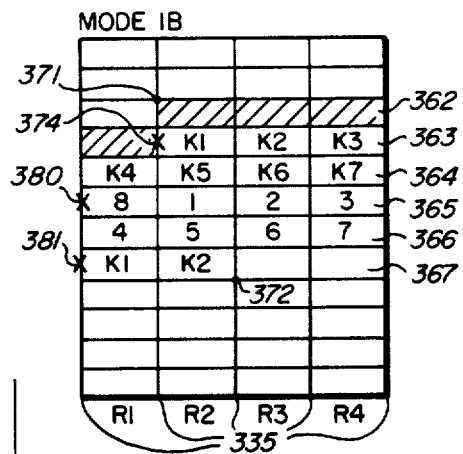
FIG. 6

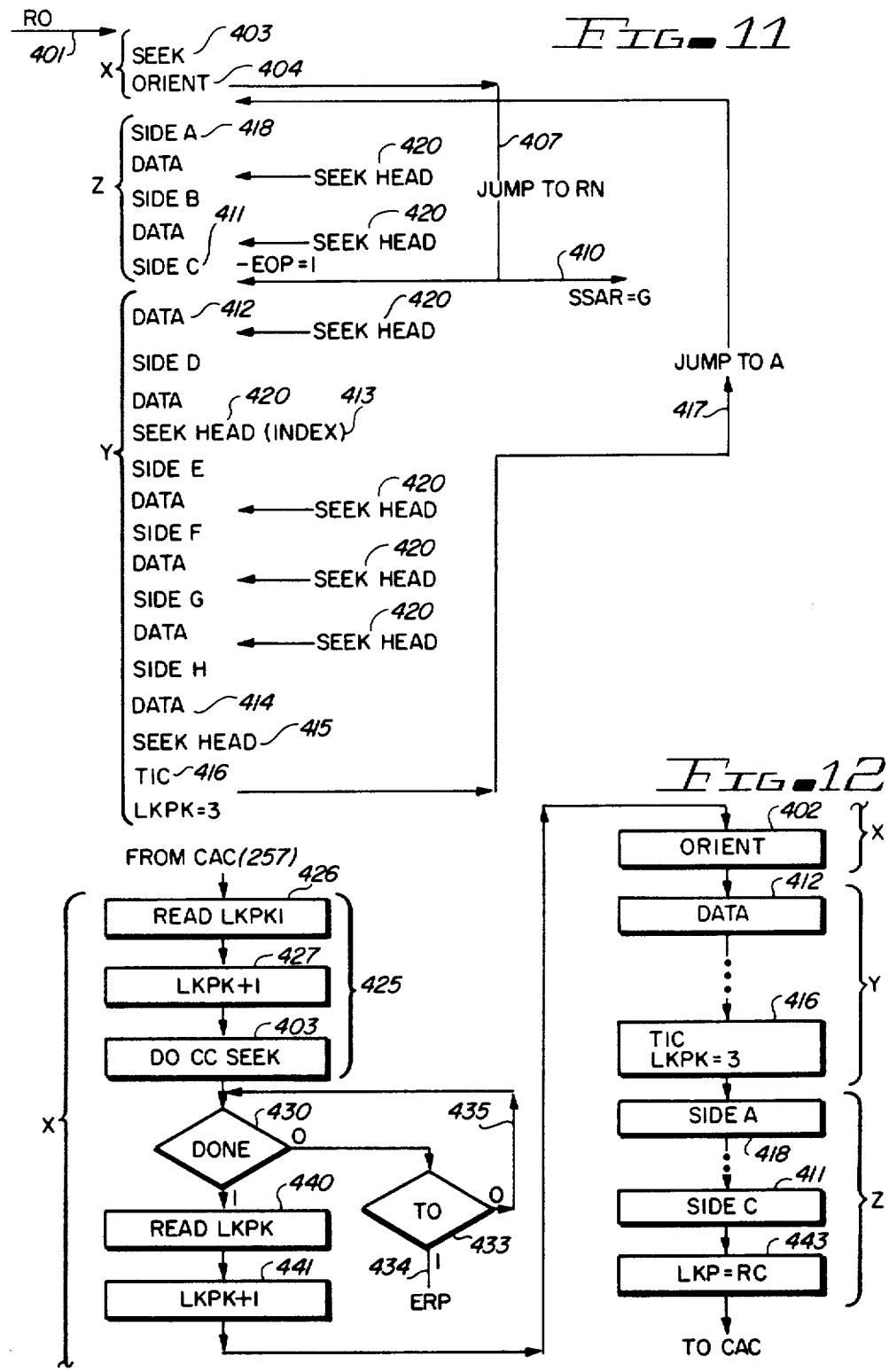

ROLL MODE FOR CACHED DATA STORAGE

FIELD OF THE INVENTION

Invention relates to peripheral data storage systems of the hierarchical type, particularly to the transfer of data signals between a backing store and a front store of such data storage system.

DISCUSSION OF THE PRIOR ART

Peripheral data storage or memory systems which are attachable to a host (central processing unit and the like) serve diverse purposes with respect to the host. Some systems are for storing user data while others are for storing so-called paging the swapping data, such as can be used in connection with paging and swapping program data sets. An example of a paging store is the IBM 2305 Fixed Head Storage Module which is described in publication GA26-1589-3 "Reference Manual for IBM 2835 Storage Control and IBM 2305 Fixed Head Storage Module" available from International Business Machines Corporation, Armonk, N.Y. This peripheral memory system consists of a magnetic storage drum which provides rapid access to the stored data. Because of its limited storage capacity, larger hosts requiring larger capacities cannot always efficiently use the IBM 2305 paging store to its maximum efficiency; extra capacity is provided by disk type direct-access storage devices (DASD). Such is particularly true when so-called swapping data sets are used, i.e. large sequential sets of data are rapidly transferred between a host and a peripheral memory. To alleviate storage capacity limitations, while not sacrificing performance criteria, a hierarchical store can be substituted for the 2305 storage drum. An example of such a hierarchical store is shown in Eden U.S. Pat. No. 3,569,938. This patent teaches the concept of an apparent store of high performance and high capacity through the use of a high speed cache memory operatively coupled to a backing store, such as a (DASD) or a magnetic tape recorder. Eden teaches that it is beneficial to page data from the backing store to the cache or front store upon demand, including paging the data that surrounds the requested data. While this arrangement is highly successful for general application of peripheral memories, when a series of backing stores share a common cache and the host is employing multi-tasking, the placement of large sets of serial data in the cache becomes troublesome. One solution is to try to make a larger cache. This solution unnecessarily adds to the cost of the peripheral system and hence is undesirable. Accordingly, some better solution is needed:

The Belady U.S. Pat. No. 3,588,839 shows promoting a next word of data whenever a given word is requested. This arrangement works fine for a cache on a main memory. However, where large sets of data are being transferred, only promoting one additional set of data does not necessarily provide maximal utilization of the peripheral memory system by the host. This lack of maximal use is aggravated by the physical characteristics of the backing store. For example, in DASD backing stores there are several significant delay boundaries caused by the mechanical characteristics of the disk storage apparatus. For example, when selecting one disk storage apparatus or another disk storage apparatus, substantial delays can be incurred. Additionally, most disk storage apparatus for controlling costs have but a one or two transducers per a recording surface. Access to all of the data areas on the disk storage apparatus is by radially moving the transducers for accessing various ones of the concentric record storage tracks. Such head movements are called cylinder seeks and require substantial delays when measured in terms of electronic speeds. Accordingly, the Belady solution, while eminently satisfactory for many applications, does not solve the problem of handling large sequential or continguous records in a multi-tasked multi-device environment. It is desired to store sequentially-processed records in non-continuous data storage areas at high data rates.

It is also desired that these peripheral memory systems minimize the amount of host intervention in the system to achieve desired goals. An example of such minimization of host intervention is shown in Bass, et al U.S. Pat. No. 4,262,332 which uses high use characteristics and a define extent mechanism for minimizing host access to DASD peripheral systems. While this certainly provides for a minimization of host intervention in such devices, it does not indicate with any of the above discussed prior art how to handle large sequential or contiguous data sets with a shared cache in a multi-tasking multi-device environment.

Disk storage apparatus, such as DASD's, exhibit a latency of rotation; this latency causes an access delay to data stored in the tracks. To minimize such latency delays, many host programs are designed to be synchronized with disk rotation. However, there is still a delay for the first access, i.e. before the disk rotation is synchronized with the host operation. Even in a cached data-storage hierarchy, the data access operations are characterized by a plurality of accesses to disk storage apparatus such that latency can be a severe hindrance to performance (performance is providing short access times to data).

To circumvent the latency delays of disk storage apparatus, IBM in the early 1960's in the type 7612 disk synchronizer for the 7303 disk file would access disk storage apparatus such that data transfers would occur at any one of a plurality of sector or rotational positions. Such data transfers only occurred for transferring an entire track of data and where the data transfers were identifiable on 4096 byte boundaries (data block boundaries). This mode of operation, called the "roll mode", was exemplified by transferring any portion of a track of data first and completing the entire data transfer irrespective of the index or beginning of track. The data transfer was to core storage in a single contiguous addressable core storage area. The roll mode concept was extended to a record mode that occupied several tracks of DASD. D. A. Stevenson in "Transparent Roll Mode for Rotating Device" in the IBM TECHNICAL DISCLOSURE BULLETIN, Volume 13, No. 1, June, 1970, pages 93 to 95 shows a roll mode operation for transferring a multitrack record. It may be noted that track switching may cause a precession in the rotational position from track to track. A variation in roll mode is shown by E. M. McGraw and John L. Kraft, "Priority Circuit for Servicing Requests Queued by Sector" in the IBM TECHNICAL DISCLOSURE BULLETIN, Volume 12, No. 6, November, 1969, pages 815 through 817 wherein each sector or rotational position has a separate queue and the queues determine accesses to the DASD record surface. A priority scheme is involved in selecting the queues. The roll mode has also been employed for rotating shift registers as shown by Richard W. Caddell in U.S. Pat. No. 4,198,699 wherein data stored in a continuously rotating shift register is transferred in a single-step roll mode. In summary, the roll mode operation provides access to a cyclic memory device, such as a disk storage apparatus, magnetic drum storage apparatus or a rotating shift register, by initiating transfers at any rotational position and continuing transfer until all data in one track (shift register) has been transferred from or to the single track of the cyclic storage apparatus. Of course, the usual format controls, i.e. identifying beginning of the data and identifying which records are being transferred still has to be followed.

While all of the above references do show reducing latency by employing a roll mode, in a cached data storage system, further enhancements are still required. This requirement is particularly true where the data transfers are controlled through a series of chains of command similar to chains of command employed in I/O processing by a host processor.

SUMMARY OF THE INVENTION

It is a principal object of the present invention to provide methods and apparatus for reducing delays in data signal transfers executed between random access storage apparatus and a cyclic storage apparatus.

In accordance with the invention, cyclic apparatus having a plurality of cyclically accessible storage tracks or shift registers is accessed in a manner to efficiently and selectively transfer a series of sequentially related data records in a succession of addressable data storage areas in the cyclic record track; there are N record storage areas in each track. Method and apparatus of the invention include examining the number of records to be transferred for a first track. If such number of records to be transferred is a predetermined portion of the number of data storage areas in the track, then the below-described operations ensue; otherwise, the data storage areas are accessed as listed in a predetermined arithmetic progression of storage addresses. The enhanced operation includes examining records or blocks of signals recorded in one of said tracks with respect to a first number of not greater than N of said listed storage addresses for identifying a one of the listed storage addresses as a storage address related to a record storage area of such one track as being a next-accessible data storage area. Then, marking an arithmetically immediately preceding one of the listed addresses as identifying a last-accessed one of the data storage areas; then successively accessing said data storage areas in one or more of said tracks as indicated by the listed addresses beginning with the next-accessible data storage area and continuing through a last one of the list of addresses in the plurality of said tracks. Upon completion of the above-mentioned accessing, then successively accessing the data storage areas beginning with the data storage area identified by a first address in the list of addresses and continuing through the data storage areas identified by the immediately preceding listed address.

In a specific form of the invention, the succession of data storage areas to be accessed are identified by a series of access commands, a one of the tracks to be accessed is monitored for its cyclic position with respect to the original list of data access commands. Based upon that monitoring, a one of the commands is selected to be a command to be first executed. The immediately preceding command is marked for end-of-processing. Then, upon reaching a predetermined cyclic position, the commands beginning with the identified commands are executed in a series through the end-of-the-chain commands. A transfer-in-channel command causes the operation to switch to a first-listed data access command. Then all of the data access commands following the first-listed data access command continuing through the end-of-processing identified data access command are executed. Where a plurality of address registers for the random access memory are involved, such address registers can be preloaded in accordance with the data storage areas to be accessed. Then, the number of the records first accessed is identified to the random access storage device such that the appropriate data is stored at the desired data storage address in the random access memory. In a read operation, the preloading can be arbitrary; no need to correlate data to cache data storage areas, such correlation may follow the data transfer.

The foregoing and other objects, features, and advantages of the invention will be apparent from the following more particular description of preferred embodiments of the invention, as illustrated in the accompanying drawings.

DESCRIPTION OF DRAWINGS

FIG. 6 diagrammatically illustrates diverse modes of data transfer roll mode operations for the FIG. 5 illustrated arrangement.

FIG. 8 is a machine-operations chart for a read command execution together with a cache hit logic flow for the FIGS. 1 and 2 illustrated data storage system.

FIG. 11 diagrammatically illustrates chained commands which effect some of the FIG. 6 illustrated operations.

FIG. 12 is a machine-operations chart showing DASD roll mode operations in the FIGS. 1 and 2 system.

FIG. 13 is a machine-operations chart showing execution of a roll mode search ICW referred to in FIG. 12.

FIG. 14 is a simplified machine-operations chart illustrating modifications to search and data access ICW's for implementing some of the functions for the FIG. 12 illustrated operations.

DETAILED DESCRIPTION

Figure 1:
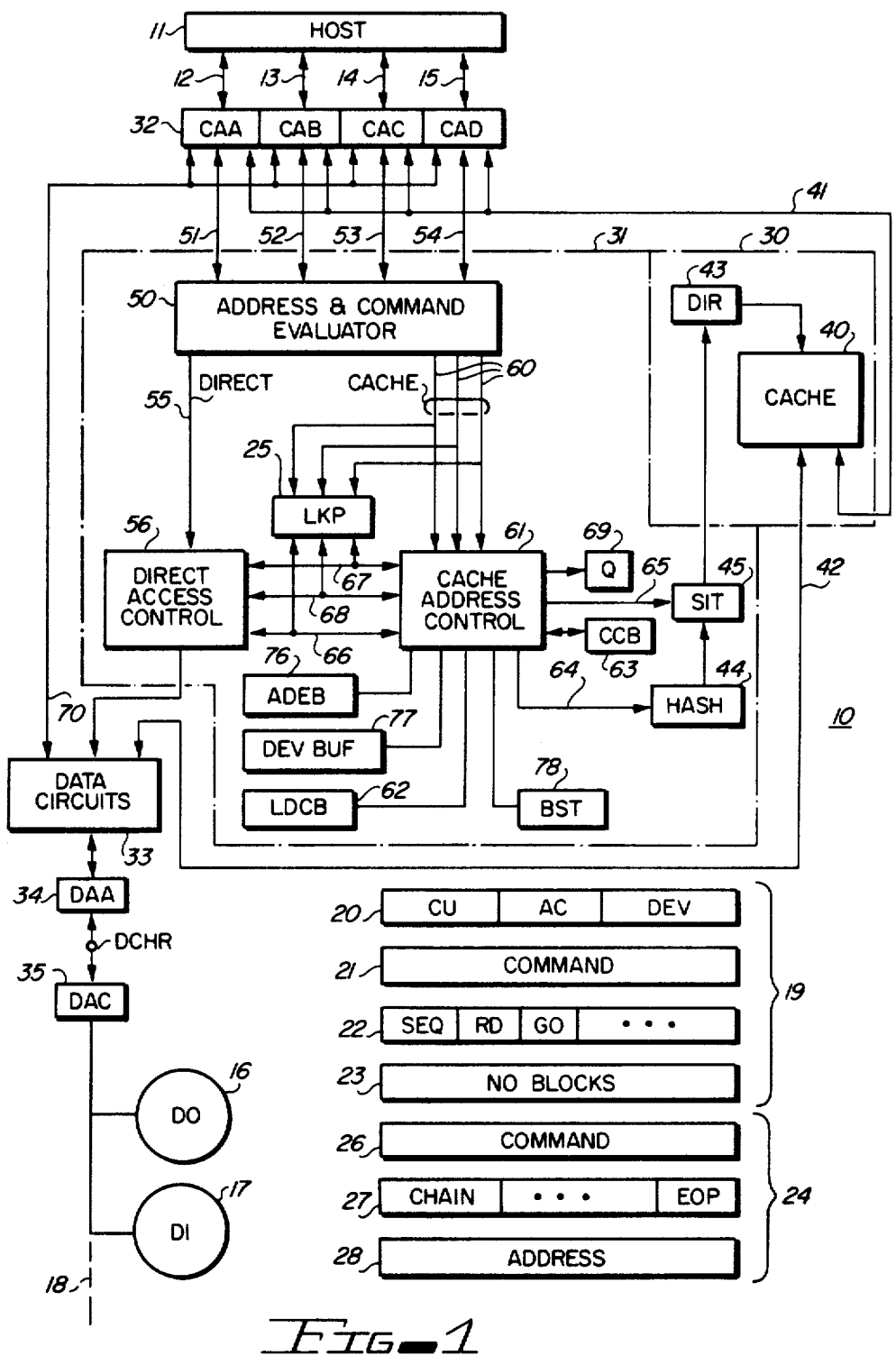
FIG. 1 is a logic diagram illustrating a peripheral data storage system connected to a host which incorporates the present invention. Also shown are channel command words and internal command words used in connection with practicing the invention.

Referring now more particularly to the drawing like numerals indicate like parts and structural features in the various diagrams. A hierarchical peripheral data storage system 10 is attached to a host 11 for receiving and supplying data signals for host and storage utilization. In a typical application of storage system 10, host 11 consists of a central processing unit (CPU). In other variations, host 11 can be a virtual machine or a set of virtual machines running on a hardware CPU. Host 11 may also be a multi-processor, a uni-processor with attached processors and the like. While the invention can be applied to a great variety of storage systems 10, the preferred and illustrated embodiment shows a paging peripheral data storage system for handling paging and swapping data sets. Generally, such paging and swapping data sets relate to storage of program data sets for host 11. As such, storage system 10 is attached to a single host while a general application peripheral storage system can be attached to a plurality of hosts. The invention can be applied to either type of peripheral storage system.

Communications between the paging data storage system 10 and host 11 is via a plurality of input/output connections 12–15 which are constructed in accordance with the input/output peripheral channels of the IBM 370 series of computers available from International Business Machines Corporation, Armonk, N.Y. Such input/output connections, commonly referred to as channels and subchannels, are so well known, their description is not necessary. Storage system 10 has a lower or backing storage portion consisting of a plurality of direct access storage devices (DASD) 16–18 and separately enumerated D0, D1, . . . All accessing of data and storage of data by host 11 with respect to peripheral storage system 10 is by addressing the DASDs 16–18. This addressing is achieved by using the architecture of the input/output connections 12–15 which are summarized in a set of logic blocks 19. Logic blocks 19 represent a channel command word (CCW) as used in the channels for the IBM input/output connections. Typically each channel command 19 includes an address byte 20. Each address byte 20 includes a plurality of bits for designating the control unit (CU) which is to receive the command. A second plurality of bits DEV which uniquely identify the devices 16–18 to be accessed. In a paging and swapping peripheral storage system 10, each of the devices 16–18 is provided with a plurality of logical device addresses, i.e. device D0 for example can be addressed by any one of four addresses. Such multiple addressing has been practiced in the IBM 2305 paging storage system to a limited degree. The logical addresses for each device are indicated in the bits AC of address byte 20. Accordingly, AC has two bits for indicating which of the four logical addresses are being used by host 11 to address a device D0. In the presently constructed embodiment, one of the logical addresses 00 designates a direct access to devices 16–18. That is host 11 operates with devices 16–18 as if peripheral storage system 10 were not a hierarchical system; all the hierarchy is by-passed for direct access. For the AC bits being equal to 01, 10 or 11, the hierarchy, later described, is accessed for obtaining data from devices 16–18 or supplying data to those devices such that the apparent performance of those devices is enhanced on those three logical device addresses. The abbreviation AC is intended to indicate accessed path (logical) to the device indicated by bits DEV.

A second byte of CCW 19 is command byte 21 which contains a code permutation signifying to peripheral data storage system 10 what function is to be performed. A third byte 22 is a command modifier byte having a plurality of control fields which electrically indicate to peripheral data storage system 10 various modes of operation for executing the command indicated in byte 21. Of interest to the present invention is the bit pattern SEQ which host 11 uses to indicate to peripheral memory system 10 tht the data to be transferred in an upcoming set of transfers will be sequential data. When SEQ portion of byte 22 indicates sequential data, then the additional command modifier byte 23 is included in the CCW 19 for indicating the number of blocks or segments of data which will be transferred from devices 16–18 to host 11, or in the reverse direction, as a sequential set of data. Such sequential sets of data in a paging environment are often referred to as swapping data sets. Additionally, byte 22 can indicate read and discard in section RD which means that once host 11 obtains data from the hierarchy, that data in the hierarchy cache can be discarded; the data in the devices 16–18 is retained. Further controls are provided by co-called "guest operating system" GO. In a virtual computer environment for host 11, one of the operating systems can have cognizance of the paging peripheral memory system 10. Access to peripheral memory system 10 can be handed over to another operating system for accessing or storing data. Such other operating system is a guest of the first operating system and hence is not allowed to modify certain control aspects of the peripheral data storage system. Other control fields are also used within byte 22 which are beyond the present description of the illustrated embodiment.

The hierarchy includes a system storage 30 of the semiconductor random access type which has a portion 40 designated as a cache for devices 16–18. Caching principles are sufficiently well known that the purposes and intent of cache 40, with respect to devices 16–18, need not be detailed. A control 31 receives the peripheral commands from host 11 for accessing devices 16–18 through one of the logical device addresses AC as well as providing access to cache 40 based upon the other three logical device addresss of AC. Data is transferred automatically by peripheral data storage system 10 between cache 40 and devices 16–18. This transfer is achieved using the same principles of transfer as between host 11 and devices 16. That is, host 11 accesses devices 16–18 in a direct mode (AC=00) via channel adaptors 32, individually denominated CAA, CAB, CAC and CAD, then over bus 70 using direct access control 56, data circuit 33, device adaptor 34 and device control attachment DCA 35. Received CCWs 19 are interpreted by control 31 for determining the direction of data flow between host 11 and devices 16–18 as well as other functions as is well known for controlling this type of storage apparatus. The relationships of cache 40 to devices 16–18 is substantially identical to the relationships between host 11 and devices 16–18. That is, while host 11 provides control via a series of CCWs 19, the control 31 provides access between cache 40 and devices 16-18 by using a plurality of internal control words (ICW) which are structured in a similar manner to the CCWs as will become apparent. Certain efficiencies in data transfer operations can be provided by altering the ICWs 24 with respect to the CCWs 19. Instead of going through the channel adaptors 32, control 31 has cache access control CAC 61 which operates system storage 30 and provides access to devices 16-18 through direct access control DAC 56 using the ICWs 24. Instead of channel adaptors 32, a linkage port LKP 25 provides for transfers between CAC 61 and DAC 56. LKP 25 is described later with respect to FIG. 3.

Each ICW 24 includes a command byte 26 corresponding to command byte 21. It should be appreciated that the code permutations for identical commands are the same. Some additional commands are provided while some of the commands for byte 21 are dispensed with. A command modifier byte 27 includes a chain control bit "CHAIN" which replaces the chaining indication normally provided by host 11 to control 31 via channel adaptors 32. (The chaining indication by host 11 is the supplying of a SUPPRESS OUT tag signal.) When final status is due to be reported by peripheral memory system 10 to host 11; SUPPRESS OUT indicates chaining, i.e. an indication of a series of closely related peripheral commands as is fully described and used in connection with the input/output connections 12-15. Since CAC 61 does not use tag signals, command modifier byte 27 is used to replace that tag control signal. EOP (end of processing) bit is used in connection with the present invention to terminate chained ICW processing at any selected location in a chain of ICWs, as will become apparent, and all ICWs have the chaining bit active. The bytes 28 of each ICW 24 point to the stored locaion of the address of the devices 16-18. No logical addresses need be used in the ICWs. In fact, control 31 converts all of the logical addresses directed to the hierarchy into bits DEV. With a sufficiently large device buffer 77, CCHH is storage with the SEEK ICW and the cache 40 address is stored with a read or write ICW. CCHH is a double-byte cylinder address "C" and a double-byte head address "H" for use by the SEEK ICW. That is, address bytes 28 not only point to the storage location of DEV but also point to the cylinder address (C), the head or track address (H) and the record address (R). The record address corresponds to a sector address used in addressing most disk storage apparatus. In a preferred embodiment, four records were provided on a single track (H address); hence the record address is 1, 2, 3 or 4 corresponding to an effective orientation of 0°, 90°, 180° and 270° of the disk with respect to a reference rotational point. Design parameters may dictate actual rotational orientations that may differ from the orthogonal orientations. As will be referred to, rather than rotational position sensing, address mark controls may be employed.

Cache 40 transfers data signals through channel adaptors 32 with host 11 via bus 41. In a similar manner, data signals are transferred between devices 16-18 through data circuits 33 to cache 40 via bus 42. When simultaneous transfers between cache 40 and host 11 or DASDs 16-18 are not desired, buses 41 and 42 are combined into a single bus time shared by the data transfers. Accessing cache 40, which can be a relatively large memory (several megabytes), requires CAC 61 to transfer the device address together with the cylinder and record addresses CHR over bus 64 to hash circuit 44. Hash circuit 44, which may be microcode implemented converts the DASD address into a hash class indicator. Since the storage capacity of cache 40 is much less than devices 16-18, the address range of devices 16-18 are concentrated into classes called hash classes for ease of access. A scatter index table SIT 45 has one register for each of the classes defined by hash circuit 44. The contents of the registers in SIT 45 are address pointers to a directory DIR 43 which contains the address DCHR used to access devices 16-18. When data is stored in cache 40, the DASD 16-18 DCHR address together with the cache 40 address is stored in a so-called entry of DIR 43. Since a plurality of device 16-18 addresses corresponds to one hash class, a singly-linked hash class list is provided in the entries of DIR 43 such that scanning cache 40 using hashing only requires scanning the entries within a given hash class. Based upon the contents of directory 43, cache 40 is accessed using known techniques. If no related entries are found in directory 43, then a miss occurs requiring CAC 61 to either allocate space in cache 40 for receiving data from host 11 or to transfer data from devices 16-18 using ICWs 24 and linkage port LKP 25.

Control 31 includes the usual portion of control units that attach to hosts. For example, address and command evaluator ACE 50 communicates with channel adaptors 32 via buses 51, 52, 53 and 54 for receiving command signals from host 11 and supplying status signals to host 11. ACE 50 evaluates CCWs 19 and instructs the peripheral memory system 10 to perform the commanded function as well as indicating the chaining conditions and receiving status signals from the other portions of the peripheral system for relaying to host 11. In a direct mode, i.e. AC=00, ACE 50 supplies command signals over bus 55 to DAC 56 such that data signals can be transferred between data circuits 33 and the appropriate channel adaptor 32 using known DASD peripheral storage device techniques. In executing its functions, DAC 56 exercises control over data circuit 33 in the usual manner.

Of importance to the present description is the operation of the hierarchy such that sequential or contiguous data sets in non-sequential data blocks can be placed in cache 40 using a minimal size cache with minimal allocation controls while maintaining sequentially in an efficient manner and maintaining a sufficient number of the data blocks in cache to satisfy the operating requirements of host 11. ACE 50, when receiving a logical device address in byte 20, indicating access to the hierarchy, supplies the received command signals over one of the three buses 60 to CAC 61. The three buses are logical buses indicating the respective cache 40 accesses. CAC 61 stores the received command and modifier data in a channel control block register 63, one register for each of the logical devices. Remember there are three logical device addresses for each of the devices. Therefore if there are eight devices 16-18 then there will be 24 registers in CCB 63 and LDCB 62.

The identification and operational status of each logical device is kept in a respective one of logical device control block registers in LDCB 62. Access to the logical device, which is represented by allocation of registers in cache 40 to the address indicated in fields AC and DEV of byte 20, is via address bus 64 to hash circuit 44. In certain situations for sequential data, sequential addresses for devices 16-18 (CHR portion) successive registers in SIT 45 can be accessed. Accordingly, CAC 61 accesses SIT 45 via bus 65 to avoid the delay in hash circuit 44. This operation enhances the response of peripheral system 10 to host 11 when sequential data is being processed. When CAC 61 receives a miss indication from searching the hash class of DIR 43, a request for a data transfer from devices 16–18 to cache 40 is supplied over bus 66 to DAC 56 via LKP 25. The bus 66 signal alerts DAC 56 to the request and indicates the ICWs are addressable via LKP 25. In the preferred microcode embodiment, LKP 25 is a microcode linkage port, as will become apparent. DAC 56 responds to the ICWs 24 in the same manner that it responds to the CCWs 19. Upon completion of the data transfer, as requested through LKP 25, DAC 56 supplies status signals over bus 67 to CAC 61. At that time, cache 40 has data available to host 11. Further communications between CAC 61 and DAC 56 are via bus 68, all such communications including storing message data in LKP 25. Because devices 16–18 are accessed through a plurality of logical device addresses, a set of queuing registers 69 queue device-related operations requested by CAC 61. In this manner, DAC 56 may not be concerned with the queuing requests through the logical devices but can operate in a direct-access DASD mode for either host 11 or for CAC 61. In this manner, DAC 56 cannot only be used in connection with the hierarchy, but can be used in those peripheral storage systems not employing a hierarchy.

CAC 61 also includes additional controls, for example, register ADEB 76 contains one entry of directory 43 with which CAC 61 is currently operating. That is, the address of device 16–18 resulted in a hit of cache 40 or a portion of cache 40 was allocated to data to be supplied by host 11; by placing the entry in register ADEB 76, operation of CAC 61 is enhanced. That is, directory 43 is a part of system storage 30; by placing the active entry in ADEB 76, system storage 30 is free to transfer data over buses 41 and 42 independent of control 31. Device buffer (DEV BUF) registers 77 contain control information relating to a device 16–18 and are used by CAC 61 in setting up accesses through DAC 56. Such registers are found in a writable control store in the microcoded implementation of the invention. Buffer 77 is merely an allocated portion of control store with no designated data structure. BST 78 is a buffer sequence table described later with respect to FIG. 3 and used in connection with practicing the present invention within the illustrated peripheral system 10. It includes pointers to directory 43 for each of the data blocks to be transferred in a sequence of data blocks over bus 42 as well as a scanning control mechanism for determining which directory index is to be used for accessing cache 40 during the sequential transfer. In this manner, a sequential transfer can dispense with addressing setups such that a burst of blocks from a device 16–18 can be made without interruption, as will become apparent.

Figure 2:
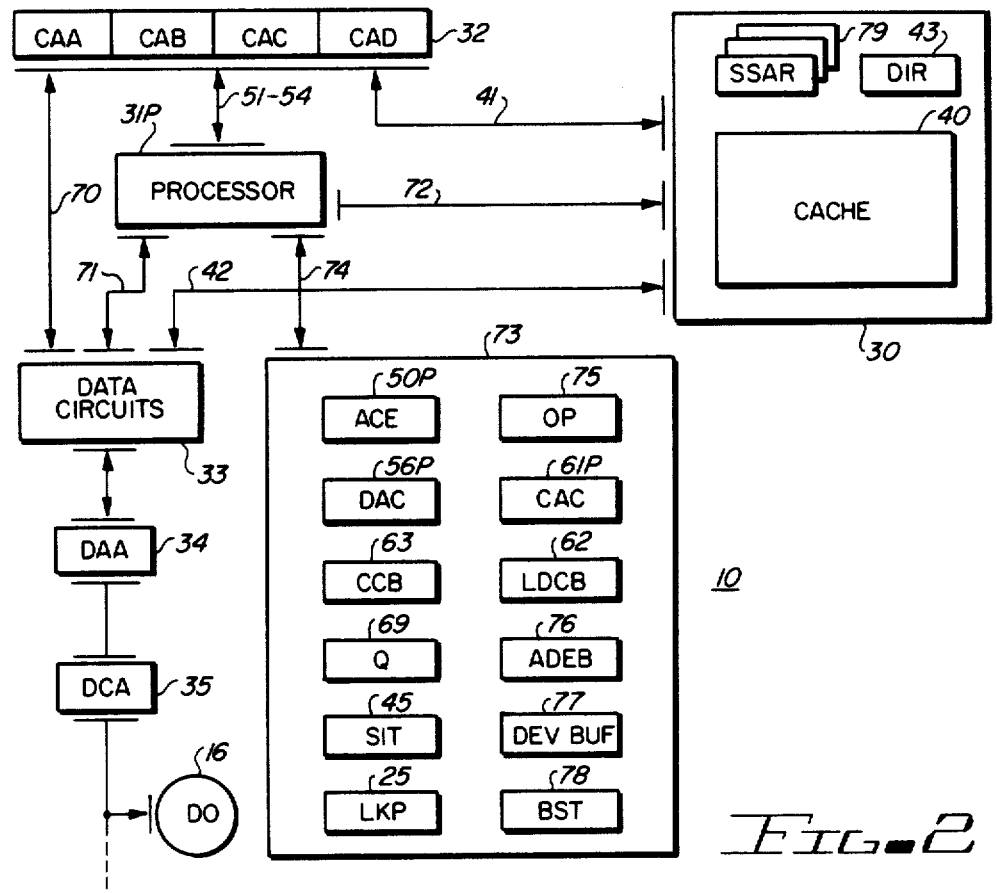
FIG. 2 is a logic block diagram of a preferred implementation of the FIG. 1 illustrated system employing a programmed digital processor for controlling the peripheral system.

FIG. 2 is a block diagram of a preferred embodiment of the FIG. 1 illustrated system which employs a programmed microprocessor 31P corresponding to control 31. Bus 70 extends from channel adaptors 32 to data circuits 33 and operates in an identical manner as shown for FIG. 1. Buses 41 and 42 extend respectively from channel adaptors 32 and data circuits 33 to system storage 30. Buses 41 and 42 may be combined into one bus with data transfers time sharing the single bus. Processor 31P in controlling the transfer between data circuits 33 and system storage 30 provides control signals over bus 71 to circuits 33 and address and sequencing control signals over bus 72 to system storage 30. A plurality of system storage address registers SSAR 79 provide addresses to system storage 30. For example, 8 or 16 SSARs 79 may be provided. Therefore when processor 31P accesses system storage 30, not only does it give the address of the system storage 30 to an SSAR 79 but indicates which of the SSARs is to be used in accessing the storage. Multiplex addressing registers to a memory are known and therefore not further described.

When cache 40 has a plurality of SSARs 79, processor 31P primes system storage 30 by loading the addresses of cache 40 (a portion of subsystem storage 30) within an SSAR such that the address need not be loaded in the SSAR 79 intermediate the successive sequential blocks. Therefore, during the sequential data transfer, processor 31P merely refers to an SSAR for initiating the transfer of data signals between cache 40 and a device 16–18. For a single SSAR 79 embodiment, an address is loaded into the single SSAR 79 intermediate record transfer. It should be noted that cache 40 has a given address space within system storage 30 in a similar manner. Directory 43 has a different range of addresses. SSAR 79 are separate electronic registers outside the memory array of system storage 30. Processor 31P communicates with channel adaptors 32 over a single bus denominated as 51–54.

Operation of processor 31P is in accordance with microcode programs stored in a control store 73 which is preferably writable; a portion can be writable while another portion containing certain programs can be read-only. Bus 74 couples the processor 31P to control store 73. Within control store 73 are programs ACE 50P which implement the function of address and command evaluator 50, DAC 56P which are programmed to implement the function of direct access control 56, CAC program 61P which implements the functions of cache access control 61 and OP 75 which are other programs necessary for operation of the storage system 10 but which are not necessary to an understanding of the present invention. The registers used by processor 31P to control the system 10 via the programs 50P, 56P and 61P include CCB 63, LDCB 62, queue registers 69, ADEB 76, SIT 45, buffer 77, LKP 25 and BST 78. For large cache 40 or when plural storage directors or control units are employed, SIT 45 is preferably stored in system storage 30. To enhance performance, a set of registers for containing a page of SIT 45 can be reserved in control store 73. When system storage 30 is shared by a plurality of controls 31, SIT 45 is always stored in system storage 30.

Figure 3:
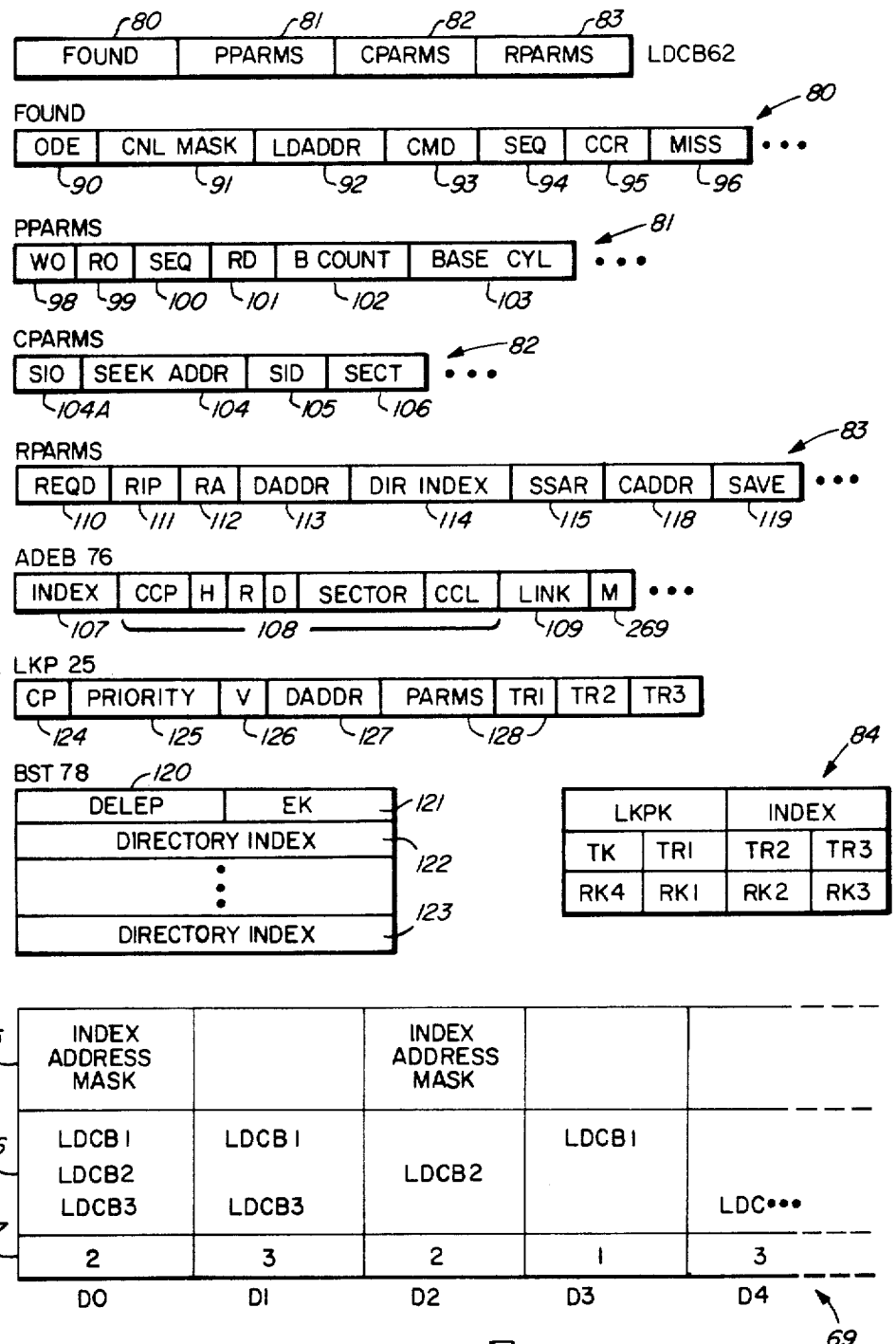
FIG. 3 illustrates various data structures used in connection with the operation of the FIGS. 1 and 2 illustrated peripheral data storage system.

Operation of the FIG. 2 illustrated preferred embodiment is best understood by reference to FIGS. 3 through 15 which illustrates the data structures in detail as well as logic flow diagrams for the microcode portions necessary for an understanding of the operation of the present invention. FIG. 3 illustrates the data structures used by a processor 31P to operate peripheral system 10 in accordance with the invention. LDCB 62 is a series of registers containing data signals in control store 73 consisting of four sections. A first section 80 is a so-called foundation data structure which defines and supports the functions of peripheral system 10 in a general operational sense. Pparms 81 is that portion of LDCB 62 relating to the parameters defining a paging and swapping function established through the later described set paging parameters command. Cparms 82 contains the command parameters such as set sector, seek, search ID command issued by host 11. These commands are those used in connection with known disk storage apparatus peripheral storage systems. Rparms 83 contain the parameters for supporting read activity; i.e. transferring data signals from devices 16–18 to cache 40.

The foundation portion 80 includes a bit ODE 90 which signifies whether or not a device end (DE) is owed by peripheral storage system 10 to host 11. CNL mask 91 contains a bit pattern indicating which channel adaptor 32 received the current command, i.e. which channel the logical device has an affinity to. LDADDR 92 contains a code permutation indicating a logical address received with the command, i.e. the bit patterns of AC and DEV of byte 20 in FIG. 1. CMD 93 contains the code permutation from byte 21 of FIG. 1. SEQ 94 contains the contents of SEQ section of byte 22 of FIG. 1. CCR 95 indicates whether a channel command retry has been sent to host 11 by system 10. In this regard, when a cache miss is indicated in section 96, a channel command retry was sent to host 11. Therefore LDCB 62 signifies when a miss has occurred for cache 40 and whether or not system 10 has supplied the apropriate CCR signal. Channel command retry merely signifies to host 11 that a delay in executing the peripheral command is required. System 10 upon reaching a state in which the command can be executed will send a device end (DE) signal to the host. The host then sends the peripheral command for the second time such that the command can then be executed by system 10.

Pparms 81 includes WO bit 98 RO bit 99 signifying that the ICW chain associated with this LDCB will be using the roll mode of this invention for either read or write operations. Sequential bit 100 corresponds to the sequential bit SEQ in byte 22. RD indicator 101 is from RD section of byte 22. B COUNT 102 contains the number of blocks from byte 23. As each block of the sequential data is transferred to host 11, B COUNT 102 is decremented by one. Therefore, it indicates the number of blocks yet to be transmitted to host 11 through cache 40. In a virtual environment, BASE CYL 103 contains the cylinder address C from which the sequential data will be transmitted from devices 16–18, i.e. in a multicylinder request BASE CYL 103 contains the value C of a virtual machine (VM) minidisk.

Cparms 82 contains the DASD seek address in SEEK ADDR 104, SIO bit 104A indicating a new chain of commands has been started, the last or current search ID argument in SID 105 and the last or current set sector value in SECT 106.

Rparms 83 includes REQD 110 indicating that a data transfer from a device 16–18 to cache 40 is required. RIP 111 indicates that a read is in progress from a device 16–18 to cache 40. RA 112 indicates that a read has been completed from a device 16–18 and that certain postprocessing functions are being performed. DADDR 113 contains the bit pattern of DEV from byte 20 (FIG. 1) for indicating the actual device 16–18 being addressed. DIR INDEX 114 contains a directory 43 index value for indicating which directory entry register contains the entry corresponding to the logical device identified in the particular LDCB 62 register. SSAR 115 identifies which SSAR 79 will be used in accessing cache 40 in a data transfer between a device 16–18 and cache 40. SAVE 119 indicates an area of the LDCB 62 registers which processor 31P uses to save control data signals during various operations, including interruption operations.

ADEB 76 is structured in the same way that each entry of directory 43 is structured. Accordingly, description of ADEB 76 amounts to a description of directory 43. In each entry of directory 43 as well as ADEB 76, INDEX 107 is the logical address of the directory entry. This field contains self identifying data for each entry. Section 108 contains the address of devices 16–18 corresponding to the data stored in cache or allocated for storage. CCP is the physical cylinder address, i.e. the actual physical address of the cylinder for a device 16–18, H is the head address, R is the record address, D is the device address bit pattern corresponding to DEV section of byte 20, sector is the actual sector value, i.e. rotational position of the disk from which reading will begin. The R value for tracks having four records can vary from one to four while the sector value is the actual sector address. In addressing the DASD, the R value is translated into a rotational position indicator at the byte level as in usual DASD addressing techniques. The R value in some host operating systems can range from 1–120 or other numbers; in such cases the larger R values are reduced to a value modulo the number of records N in a track. Then the R value, modulo N, is converted to a rotational address of the disk. Such sector value is suitable for initiating access to a record with a minimal latency delay. CCL is the logical cylinder address such as provided for logical devices which are defined on physical devices. Link 109 contains the data signal code permutation of the singly-linked list for linking all entries of a hash class together. The last entry of a given hash class will have a particular code pattern (zeroes) indicating end of chain or end of class. M bit 269 indicates whether or not the data in cache 40 has been modified since it was received from a device 16–18. Other code permutations can be added to each directory 43 entry and which are not pertinent to an understanding of the present invention. For example, an MRU-LRU list may be included in each entry.

LKP 25 is an area in control store 73 accessible by programs ACE 50P, DAC 56P and CAC 61P which make up a linkage port or message area for controlling the interaction of the execution of these microcode units. In one embodiment, ACE 50P and DAC 56P were treated as one code segment such that LKP 25 was accessed by those two microcode sections as a single unit. In any event, the structure of the port includes a code point CP 124 which identifies the portion of the code which lodged the control data in the port. That is when CAC 61P lodges an entry in LKP 25, DAC 56P fetches the control data and executes the function. Then, when DAC 56P enters new data in LKP 25 responding to the CAC 61P request, CP 124 indicates to CAC 61P which point in code execution the DAC 56P furnished data relates to so that CAC 61P can continue processing based upon the DAC 56P response. Priority section 125 contains code permutations indicating whether the request lodged in LKP 25 is high priority, low priority or a continued processing. V bit 126 indicates whether or not the LKP 25 entry is valid, i.e. is it a recent entry requiring action. DADDR section 127 contains the DEV code permutations from byte 20 for identifying which device 16–18 is associated with the current LKP 25 control data signals. PARMS 128 contains various parameters associated with the message, i.e. what function is to be performed, status and the like. TR1, TR2, TR3 designate a number of records in each of three tracks in a variation of roll mode operations.

BST 78 has a set of registers for each of the devices 16–18. A first register includes section DELEP 120 which contains an index value of 1 to 8 pointing to the directory indices 122-123. These indices identify the directory 43 entries which are to be deleted. EK 121 contains a count of the number of valid entries in the table. The first directory pointer index is always stored in 122 while the eighth one is always stored at 123. For a value of three in EK 121, a third directory index is accessed. Directory index, remember, is a logical address of a directory 43 entry, hence provides a rapid access into directory 43.

Operations between system storage 30 and devices 16-18 are asynchronous and substantially independent of operations between host 11 and devices 16-18 and between host 11 and system storage 30. To achieve this independence, a set of read queues and write queues are established in the set of queue registers 69. Queue registers 69 (FIG. 3) include write queue 85 which has a separate queue for each of the devices labeled D0-D4 . . . Each write queue contains an index corresponding to INDEX 107 of DIR 43. The write queue also stores the address necessary for accessing the devices 16-18 which includes a seek argument, seach argument, sector, device mask and the address for accessing cache 40, such as the cache block address and the SSARs 79 used for addressing system store 30. A link field (not shown) can be included to contain a pointer to a next entry in the write queue 85 for the given device or for pointing to the next device write operation, i.e. which page in cache 40 is to be next written to a device 16-18. Accordingly, each write queue 85 can contain one or a plurality of references to cache 40 for accessing records or data blocks to be written to a given device 16-18.

Queue registers 69 also include read queues each of which includes portions 86 and 87. Each read queue is a round-robin queue. Portion 86 contains the LDCB 62 addresses for identifying which logical devices require data transfers from a device 16-18 to cache 40. Portion 87 indicates a pointer to one of three possible entries in each queue for indicating which logical device is to be next serviced. For example, D0 portion 87 contains numeral 2 indicating that LDCB 2 is to be next serviced; following LDCB 2 then LDCB 3 will be serviced, then 1. D0 has a full read queue for all logical devices associated with device 16. Device D1 corresponding to device 17 has two entries. In this read queue LDCB 1 and LDCB 3 with the pointer number 3 and portion 87 indicating that LDCB 3 is to be next serviced. Accessing a read queue 86-87 enables processor 31P to access the correct LDCB 62 for transferring data from a device 16-18 to cache 40 in an appropriate sequence relative to the sequence that the data was requested by host 11. The device read queues are scanned in the round-robin fashion in the same manner that the LDCB pointers of portion 86 are scanned. Other forms of priority determination may be used while practicing the present invention. In addition to the registers shown in FIG. 3 other registers may be employed in constructing a storage system 10; those registers are not necessary to an understanding of how to practice the present invention in the illustrated environment.

Table 84 is useful for establishing algorithms for effecting the roll mode in an alternative embodiment where the roll mode data transfer operations are not completely synchronized with the cyclic characteristics of the cyclic storage media. LKPK is a counter indicating which ICW is to be next accessed. The index portion indicates the number of records to be transferred from a given track or group of data storage areas. TK is a relative track number for the current roll mode as will be explained. TR1, TR2 and TR3 respectively indicate the number of records to be transferred from each of the three relatively addressable tracks T1, T2 and T3. RK1, RK2 and RK3 indicate the number of records transferred in the current roll mode operation for the respective tracks T1, T2 and T3. RK4 is a cumulative count of the records transferred. Utilization of this table is explained later with respect to FIG. 6.

Figure 7:
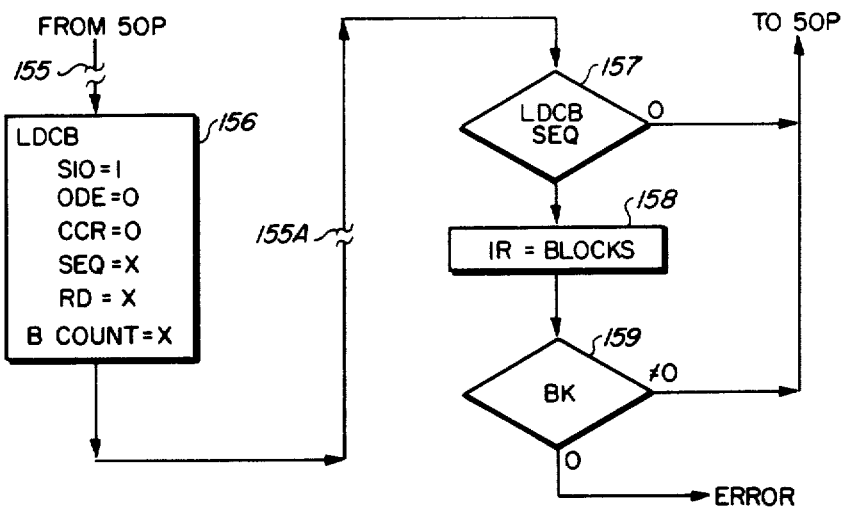
FIG. 7 is a logic flow diagram showing execution of a set paging parameter command by the FIGS. 1 and 2 illustrated peripheral data storage system.
Figure 4:
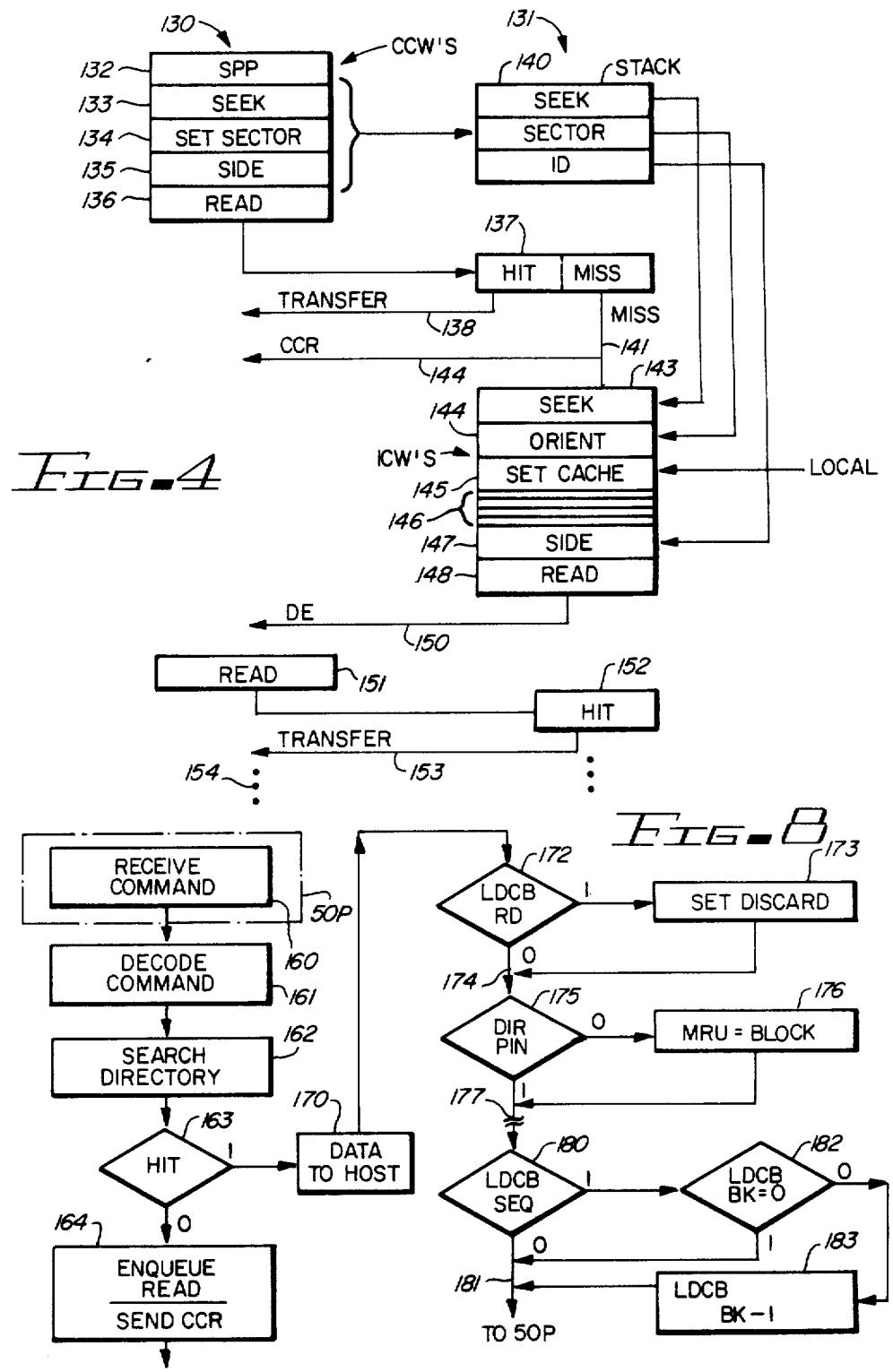
FIG. 4 diagrammatically illustrates a mode of operation of the FIGS. 1 and 2 illustrated peripheral memory system employing channel command words and internal command words.

FIG. 4 illustrates a sequence of CCWs and ICWs in a read or write data transfer. A read transfer transfers data signals from an addressed device 16-18 to host 11, while a write transfer is a data transfer in the reverse direction. A chain of CCWs 130 begins with set paging parameters (SPP) CCW 132. FIG. 7 illustrates the execution of such a command by storage system 10. Fundamentally, SPP 132 sets whether or not sequential data is to be transferred from the peripheral storage system 10 to host 11 as well as other parameters identified in byte 22 of CCW 19 (FIG. 1). Once SPP has indicated parameters of operation to system 10, a seek CCW 133 results in a seek command being transferred to the peripheral storage system; in one embodiment the seek parameters were embedded in the SPP command. Using normal DASD architecture, seek is followed by set sector CCW 134 which in turn is followed by a SEARCH ID EQUAL (SIDE) command 135. Now the storage system is ready to read data from an addressed device 16-18 by read CCW 136. Upon receipt of a read command, peripheral storage system 10 provides the action indicated in column 131. First of all, the SEEK, SET SECTOR and SEARCH ID commands are stacked as at 140. At 137 a directory 43 search, as explained with respect to FIG. 1, is conducted. For a hit, i.e. the requested data is in cache 40, the data is immediately transferred as indicated by arrow 138 from cache 40 to host 11 via the channel adaptor 32 which received the command. On the other hand, if directory 43 indicated the data was not in the cache, then a miss has occurred as indicated at arrow 141. A channel command retry (CCR) is supplied by system 10 as indicated by arrow 144. This tells host 11 that when a DEVICE END signal is received from system 10, that READ CCW 136 must be reexecuted by the channel by sending the same read command to system 10. While this is occurring, system 10 constructs a chain of ICWs 143-148 beginning with SEEK ICW 143 (causes heads 340 to move or seek to an addressed cylinder of tracks) which is derived from the stacked SEEK commands received from host 11. For a multitrack operation, the ICWs are derived from search ID parameters. SEEK ICW 143 is followed by an ORIENT ICW at 144. The ORIENT ICW activates DAC 56P to identify the first full record to be next encountered by heads 340 in a selected one of the disk 330, 331, 332, 333 record surfaces. The first step in identifying the next full record area is a so-called untimed address mark 335 search, in DASD this special signal recorded in a track signifies that the following signals are a record count field (ID). When the first address mark (can be INDEX) is encountered, DAC 56P reads the record count filed to ascertain the present rotational position (R1 follows INDEX, R2 is at 90°, etc.). Because of time constraints in the illustrated embodiment, the record following the next record is accessed, i.e., if R1 is at the present rotational position, record R2 is accessed, no limitation thereto intended. The SET CACHE ICW 145 activates DAC 56P to transfer cache 40 addresses for the records to be transferred to the SSARs 79 in the order the records will encountered on the DASD record disks by transducers 340. The cache 40 addresses for these identified records are fetched from LKP-25 and stored in SSARs 79, beginning with the second encountered record cache 40 address in the SSAR 79 identified as number 0, the second encountered record cache 40 address in the SSAR 79 identified as number 1, etc. for all records to be transferred. When a plurality of blocks of data are to be transferred, then a plurality of SET CACHE ICWs occur as indicated by numeral 146. Then a SEARCH ID EQUAL ICW 147 corresponding to the SIDE CCW 135 occurs. The SEARCH ID EQUAL (SIDE) ICW 147 corresponds to the first SET CACHE ICE 145 and establishes that the record to be accessed is the second occurring record. Thereafter, no SIDE commands are used in a roll mode operation. This means a plurality of blocks of data are read in sequence using but one SIDE ICW 147. Then a number of READ ICWs 148 commands equal to the number of data blocks to be transferred are fetched from LKP-25 by DAC 56P for reading a predetermined number of blocks of data indicated by the number of SET CACHE ICWs. Upon completion of the read, which transfers data between the addressed device 16-18 and cache 40 at the addresses set in SSARs 97, system 10 supplies a DEVICE END (DE), as indicated by arrow 150, to host 11. Host 11 immediately responds by reissuing a peripheral command at 151 corresponding to the CCW 136. Of course, system 10 searches directory 43 at 152 resulting in a hit because of the just executed ICW chain. Data is then transferred from cache 40 to host 11 as indicated by arrow 153. In the event that the data was not transferred for the requested data block at 136, another miss will occur and if a subsequent retry fails, an error status will be reported to host 11. This error status will reflect the fact that system 10 was unable to transfer data from the addressed device 16-18 at the cylinder and head address. Host 11 then can use the direct access (AC=00) for attempting recovery using standard disk storage apparatus recovery techniques beyond the scope of the present description. Ellipsis 154 indicates that the above-described operation is highly repetitive as well as indicating that various CCW chains for various devices 16-18 can be interleaved. The ICW chains do not necessarily follow the sequence of chains of CCWs. Depending upon the circumstances, an ICW chain may be constructed and used by a later occurring CCW chain. Such possibility indicates the asynchronous aspect of the ICW chains with respect to the CCW chains. Usually, the first CCW chain will result in a first occurring ICW chain. At any instant, a separate ICW chain can be active for each DASD 16-18.

Figure 5:
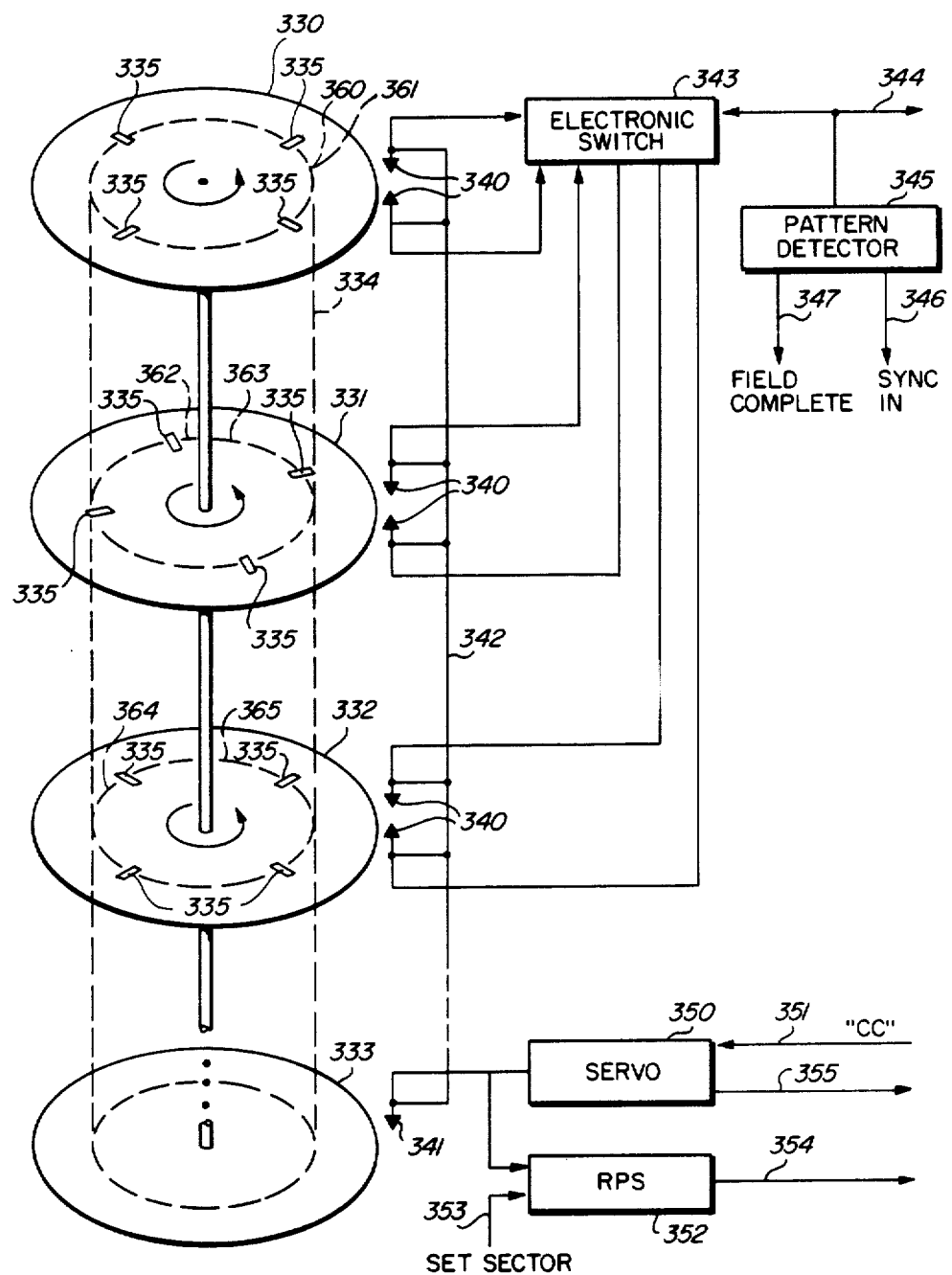
FIG. 5 shows a data storage arrangement illustrative of a cylinder of tracks and rotational positon sensing of a DASD shown in FIG. 2.

FIG. 5 illustrates a cylinder of tracks in a DASD 16 together with functional aspects that affect the practice of the present invention. It is to be understood that FIG. 5 is simplified for accenting those portions of DASD 16 which facilitate an understanding of the present invention. A typical DASD includes a plurality of record disks 330, 331, 332 and 333 which have magnetically coated surfaces for magnetically recording digital signals. A surface on disk 333 typically will contain a set of servo signals which identify to DASD 16 the radial position of a plurality of heads 340 in a comb support structure 342, in a radially movable relationship to the respective recording surfaces of disks 330, 331 and 332. Transducer or head 341 moves along the surface of disk 333 for sensing the above-mentioned servo signals such that the radial position of the heads 340 is accurately indicated with respect to a plurality of record tracks on the respective recording surfaces. For example, disk 330 will have a pair of tracks 360 and 361 on opposite surfaces which are radially aligned with corresponding pairs of record tracks 362 and 363 on disk 331 and record tracks 364 and 365 on disk 332. These radially aligned tracks constitute a cylinder of tracks in a practical embodiment, a larger plurality of record disks are employed such that up to 17, 18 or more record tracks constitute a cylinder of tracks represented by numeral 334. Additionally, in the illustrated embodiment, each of the respective record tracks are divided into a plurality of circumferential portions of track, each portion of a track containing a single record of 4096 bytes of data. The record areas are diagrammatically illustrated as being separated by bit patterned or address marks 335, each having a rotational address relatable to the usual address sectors of DASD. In one constructed embodiment using the invention, marks 335 were beginning of record identifiers (bit patterns) located in the respective record tracks at arbitrarily chosen locations with respect to the usual track index mark (not shown) used on current day DASD's. That is, upon completion of a SEEK to a cylinder, an untimed (independent of current rotational position) search for address mark (AM) occurs. The first detected AM results in reading the stored identification (ID) for the upcoming record. This ID yields the current rotational position of the track with respect to its transducer 340. If INDEX is detected, then record ID R1 is used. This ID determines the offset in the chain of ICWs the roll mode will begin. This action orients the ICW chain to disk rotational position.

Electronic switching system 343 enables switching between the record tracks at electronic speeds which means that the record tracks in the cylinder 334 can be rapidly accessed subject to the latency of rotation of the respective disks 330 and so forth. Accordingly, it is desirable to operate with the record tracks on a cylinder basis. The electronic switching system 343 supplies signals to and receives signals from a bus 344 connected to data circuits 33 (FIG. 2) through DAA 34 and DCA 35. Pattern detector 345, preferably within the DASDs 16-18, detects the bit pattern or mark 335 to supply a sync-in signal 346 to be relayed to processor 31P over bus 71 as an interruption signal. The signal can be polled; the term interruption signal is intended to include either. This sync-in interruption signal is used as later described with respect to the roll mode of operation. A field complete signal, on line 347 is also supplied by pattern detector 345 which signifies to processor 31P that one field of data has been successfully transferred from a record track to data circuits 33 such that the data contents are available for use by processor 31P. For example, a record identification field can have three bytes of identifying data. When pattern detector 345 has detected that three bytes have been successfully transferred over bus 344, then field complete interrupt on line 347 goes to processor 31P. The connection between pattern detector 345 and bus 344 is intended to diagrammatically represent the connection from DO 16 of FIG. 2 to DCA 35, DAA 34 and the connections (not shown) as usually found within data circuits 33. It is to be understood that the signals on bus 344 can be routed to cache 40 or over bus 70 through channel adaptors 32 to host 11.

Servo positioning head 340 through the servo sensing head 341 is provided by servo circuits 350 based upon a radial position address "CC" for cylinder 334 received over line 351 from processor 31P. Completion of the head seek is indicated by servo circuits 350 supplying a seek complete signal over line 355 to processor 31P. The actual transfer of these address signals, of course, proceeds from processor 31P through data circuits 33, DAA 34, DCA 35 to DO 16 as seen in FIG. 2 and as is usually practiced in the art. RPS detector 352 receives a SET SECTOR or rotational position from processor 31P as indicated by arrow 353. RPS circuit 352 then compares the current rotational position of the disks 330–333 with the SET SECTOR value and when equal to supply a signal indicating rotational position is at the SET SECTOR value over line 354 which eventually goes to processor 31P. Processor 31P, when supervising the transfer of data between a host 11 and DO 16 will signify to host 11 that DO 16 is ready to continue the chain of commands. Host 11 then responds in the usual manner for transferring data. When data is being transferred between cache 40 and DO 16, the DAC 56P of processor 31P stores the ready information in LKP 25 and transfers control of processor 31P to CAC 61P such that the cache 40 and the SSARs 79 are prepared for transferring data between DO 16 and cache 40.

FIG. 6 diagrammatically illustrates the operation of the present invention in the illustrated system in any one of five modes. Mode 1 is a preferred mode because of the simple controls required for providing an expected roll mode operation. Attributes of the mode 1 operation include rapid synchronization of the roll mode data transfers to the index of a record track. Once the roll mode operation is synchronized to the index, then data transfers become most efficient as will become apparent. A cylinder of record tracks is shown in diagrammatic form for each of the five modes. Numerals 360 through 367, inclusive, respectively denote separate record tracks on diverse record surfaces of a single cylinder of record tracks. The vertical lines denoted by numeral 335 correspond respectively to the record demarcation rotational positions 335 of FIG. 5. The index mark for all of the record tracks in the cylinder are denoted by the left-hand vertical line 370. For convenience of reference, each of the tracks store four records denominated R1, R2, R3 and R4 along the bottom of each diagrammatic representation. Each of the modes is described with respect to an address extent beginning at 371 and extending through 372 such that three record areas on track 362 are employed while two record areas on track 367 are employed. The intervening tracks 363–366 each store four records in the defined extent. Hatched area 373 represents that data which has been previously transferred to cache 40. Assume that at the beginning of the present description a data access request has been received from host 11 resulting in a cache miss at 374, i.e. record R2 of track 363 was requested but is not stored in cache 40. A sequential mode has been indicated; that is, host 11 has signified to the data storage system that it intends to use a plurality of records within extent 371–372 in a sequential manner. CAC 61P of processor 31P analyzes the request and indicates that a roll mode operation should ensue. Accordingly, a chain of ICWs 24 is constructed for sequentially reading tracks 363 and 364 beginning with R1 of track 363 and continuing through record R4 of track 364. The hatched area 373 corresponding to record R1 portion of track 363 will be retransmitted from DASD 16 to cache 40 for obtaining synchronization of the roll mode with the track indexes 370. As shown, the roll mode used for tracks 363 and 364 begins by reading record R3 (first record encountered after a SEEK) of track 363 and as indicated by numeral 1. Then, record R4 of track 363 is read as the second block of data. In a multitrack operation or during an ICW multitrack operating when index 370 is reached the DASDs automatically switch the reading to the next track 364. In another embodiment, track switching is controlled by DAC 56 as in many present DASD storage systems. The third record read is record R1 on track 364 followed by records R2, R3, R4 (records 4, 5, 6 in the sequence) of that same track. Then a head switch command switches to the first track to cause the track 363 record R1 to be read which is a duplication of staging of data from DASD to cache 40. The operation is completed by reading record R2 of track 363 as the eighth and last record being transferred. The EOP flag in the ICW for reading R2 indicates completion of the roll mode operation. At this time, two complete tracks of data have been transferred from DASD to cache 40 with restaging of record R1 of track 363 effecting synchronization of the roll mode to index 370 of the DASD. In the event only staged record has a previous copy in cache 40, the previous copy is retained and the just-staged copy is discarded from cache.

Host 11 will then access the data staged from DASD to cache 40 such that a next cache miss occurs at 375. This cache miss is synchronized with the index 370 such that the next roll mode of transferring data contents of tracks 365 and 366 to cache 40 omits any restaging. As shown, record R4 of track 365 is the first record read followed by records R1–R4 of track 366. The roll mode is completed by transferring records R1–R3 of track 365 as blocks 6, 7 and 8 of the roll mode transfer. The next cache miss occurs at 376, also synchronized with the index mark 370. However, since only two records, R1 and R2, of track 367 remain in the defined extent 371–372, the roll mode is not instituted; rather a direct data transfer represented by numerals K1 and K2 respectively for records R1 and R2 transfer data from the first half of track 367 to cache 40. Access to records R1 and R2 are dependent upon the latency delay times for the data transfer as opposed to avoiding the latency delays and RPS misses in the transfer tracks 363 to 366.

Mode 1A shows synchronizing the roll mode to index 370 while avoiding restaging record R1 of track 363. At the first cache miss at 374, the records R2–R4 of track 364 are promoted to the cache in a regular data transfer operation as indicated by numerals K1, K2 and K3 respectively. In this transfer, the usual latency time delays occur such that data transfer always begins with record R2 of track 363. This mode of operation is desirable when the data transfer time of the record is a significant portion of the latency time. For example, rather than providing the regular transfer K1, K2, K3 for track 363, it may be desired to use mode 1A only when two or fewer records of track 363 occur. Therefore, it is preferred to retransmit or restage data when the restage time is less than one-half the rotational period of the DASD. Following staging track 363, a subsequent cache miss such as at 378 results in a full two-track roll-mode operation. As shown, tracks 364 and 365 are promoted in the roll mode beginning with record R3 of track 364 as indicated by the numbers 1 through 8 in the mode 1A illustration. The next cache miss at 379 results in a roll mode promotion only of track 366 data. If the roll mode began with record R1 of track 366, the roll mode is extended to records R1 and R2 by appending two additional commands to the roll mode. Alternatively, a command chain for roll mode promotion of track 366 and 367 can be constructed; if the first encountered record to be promoted is record R1, then the first two records of track 367 are promoted. Otherwise, only the contents of track 366 are promoted for avoiding the latency delays occurring by scanning but not reading records in the R3 and R4 portions of track 367. An alternative, for reducing device selections, is to scan records R3 and R4 of track 367 but not transfer data.

Mode 1B merely changes from mode 1A in that instead of K1, K2 and K3 data transmissions relating to track 363, the entire data contents of track 364 are also transmitted with the three records of track 363. This extended data staging delays the next and index synchronized data transfer until 380 which allows the data contents of track 365 and 366 to be transmitted to cache 40 using the roll mode for those two tracks. Then the last two records, R1 and R2 of track 367 are transmitted in the usual fashion. Again, numerals 1 through 8 indicate the sequence of data transmissions for the data from track 365 and 366.

Mode 2 provides for roll mode operation without data transfer synchronization to index 370. This mode requires several electronic head seeks; therefore, the elapsed time between successive record areas should be sufficient for allowing head switching. In the event inter-record times are insufficient to allow track switching alternate techniques may be employed such as using "dummy" records or interfacing record reading (read alternate records, such as all even numbered records, then all odd numbered records). Mode 2 reading begins in the first track T1 which in the illustration is track 363. The reading switches at the index 370 to track T2 (364). When the logical position of the cache miss 374 is reached and some record areas of track T1 have not yet been transmitted to cache 40, those records (R2 of 363) are then read. Upon completion of reading those records, track T2 is again switched to (read records R3, R4 as fifth and sixth transmissions) with index switching to track T3 (365) for reading the seventh record (R1 of track 365). The last record to be read will be in the middle track T2 (364) in the same logical position as the record R2 (fourth record) read from the first track T1 (363) after passing the index mark the first time. As shown, the first record transferred is R3 of track T1, the second R4 of T1 followed by R1 of T2. Then a head seek or switch moves the reading to track T1 for reading record R2 of T1 as the fourth record. In the event that record R3 of T1 was not read, that would also be read at this time. Upon completion of reading R2 of T1, a second head switch causes records R3 and R4 of T2 to be read as the fifth and sixth records. The track switch at index 370 causes record R1 of T3 (365) to be next read followed by the last record R2 of track T2. Subsequent to this roll mode transfer, the remaining three records, R2, R3 and R4 of T3 are read for synchronizing the roll mode to index 370. Then tracks 366 and 367 are read in a roll mode as described for mode 1A, otherwise the present procedure can be repeated for records R2-R4 of T3.

In mode 3, synchronization is achieved as in mode 1; however, rather than transmitting the data of record R1 of track 363, only seven records are transferred with the R1 portion of track 363 merely being scanned without data transfer. In the first roll mode operation following a cache miss 374, track 363 is read beginning with the first occurring address mark 335 synchronization, as at R3, followed by reading R4. The index at 370 switches to track 364 for reading its entire data contents. Then record area R1 of track 363 is scanned with data transfer occurring for record R2 as the seventh and final step. Then tracks 365 and 366 in mode 3 are read in a full roll mode following the procedure set forth for mode 1. Track 367 is read as described for mode 1.

From all of the above, it should be apparent that synchronization of the roll mode to the index 370 early in a roll mode operation in a sequence of roll mode operations within a given cylinder facilitates efficient data transfer. While other modes can be used, additional controls that will become more apparent are required for efficient data transfers.

FIG. 7 illustrates the execution by system 10 of the SPP command. ACE 50P receives and decodes the SPP command. As a result of that decoding, processor 31P activates CAC 61P. Upon activation, processor 31P via CAC 61P performs certain nonpertinent logic functions at 155. Then at 156, LDCB 62 (FIG. 3) is accessed for setting SIO 104A in CPARMS 82 to unity, setting ODE 90 in foundation section 80 to 0, setting CCR bit 95 to 0, setting SEQ 100 to the value received in byte 22 (indicated by X), RD section 101 is set to the value in RD section of byte 22 and B COUNT 102 of PPARMS 81 is set to the value indicated in byte 23. Following setting LDCB 62, processor 31P performs some nonpertinent logic functions at 155A. Then processor 31P at 157 examines LDCB 62 section SEQ 100 to see if sequential data is involved. If not, processor 31P returns to ACE 50P via LKP 25. If the sequential data is indicated, processor 31P at 158 transfers the number of blocks indicated in B COUNT 102 to an internal register IR (not shown) of processor 31P. In the illustrated embodiment a maximum of eight blocks were to be transferred in a given burst of data blocks. In that embodiment when B COUNT was greater than or equal to eight, eight blocks were transferred and B COUNT reduced by eight. For B COUNT less than eight, a number of blocks equal to B COUNT were transferred. Then at 159 the value of the block count is examined. If it is nonzero, then an appropriate SPP command execution has occurred. If the block count is 0, then the sequential indicator or the block count must be in error. Accordingly, processor 31P leaves step 159 to go to an error status reporting procedure beyond the scope of the present description.

The seek, set sector, and SIDE CCWs 133-135 are not described since they are well known. A change in system 10 operation from the prior art occurs upon the receipt of a read command based on read CCW 136 for sequential data. FIG. 8 illustrates the machine operations for transferring sequential data. At 160 the received command is processed by ACE 50P. Then through LKP 25, CAC 61P is activated by processor 31P. The command is again decoded at 161. Since it is a read command, directory 43 is searched at 162 as described with respect to FIG. 1. At 163 processor 31P determines whether or not the directory search resulted in a hit or a miss. For a miss, the received command is enqueued at 164 by placing the command and its control information in queue registers 69. A CCR is sent to host 11. Since queue registers 69 can use any format they are not further described except to say that the queue is a first-in first-out queue for each of the addressable devices, i.e. for eight devices 16-18 there are eight queues. The importance of having a FIFO queue is to ensure that the sequence of responses to the host for a given device corresponds to the sequence of commands sent by the host. From queue 69, CAC 61P initiates a read or write operation with the addressed device 16–18, as explained with respect to FIG. 9 et seq.

A hit condition in the directory search at 163 results in cache 40 automatically transferring data to host 11 via the appropriate channel adaptor 32 at 170. Such automatic cache to host transfers are well known and not described for that reason. During the automatic data transfer an error can occur; accordingly, upon an error detection, processor 31P goes to an error reporting and analyzing routine (not shown). Generally the data transfers will be error free. At 172 following the successful completion of a data transfer, processor 31P accesses LDCB 62 to examine RD section 101. If discard after read is indicated, processor 31P sets the just read block of data for destage (now or later) if modified; and free, if not modified. Destaging is performed by processor 31P when no commands are being executed. Destaging the data prior to requirement of a replacement algorithm being invoked, even though some unnecessary destaging may occur, reduces the control required for efficiently managing cache 40, i.e. free spaces are made available before they are needed. Then through logic path 174, from either steps 172 or 173, processor 31P at 175 determines from directory 43 in a field (not shown) whether or not the data is pinned to cache 40. Pinning data to cache 40 means that it cannot be transferred to devices 16–18 until a pinning flag (not shown) of directory 43 has been erased. If the data is not pinned to cache, then the block that was just read is made the most recently used (MRU) block at 176, in the LRU list (not shown) for the replacement algorithm. This is achieved by accessing directory 43 and updating the least recently used list of known design in that directory. At 177, nonpertinent logic steps are performed by processor 31P. Then at 180, LDCB 62 is again accessed for examination of SEQ 100. If sequential data has been indicated, then processor 31P at 182 examines LDCB B COUNT 102 to see if the block count is equal to 0, i.e. is the just-transferred block the last block in the sequence of data. If it is not the last block transferred, then at 183 the block count (BK) is decremented by 1. Following steps 180, 182 or 183 logic path 181 leads processor 31P back to ACE 50P for performing final status reporting to host 11 in the usual manner.

Figure 9:
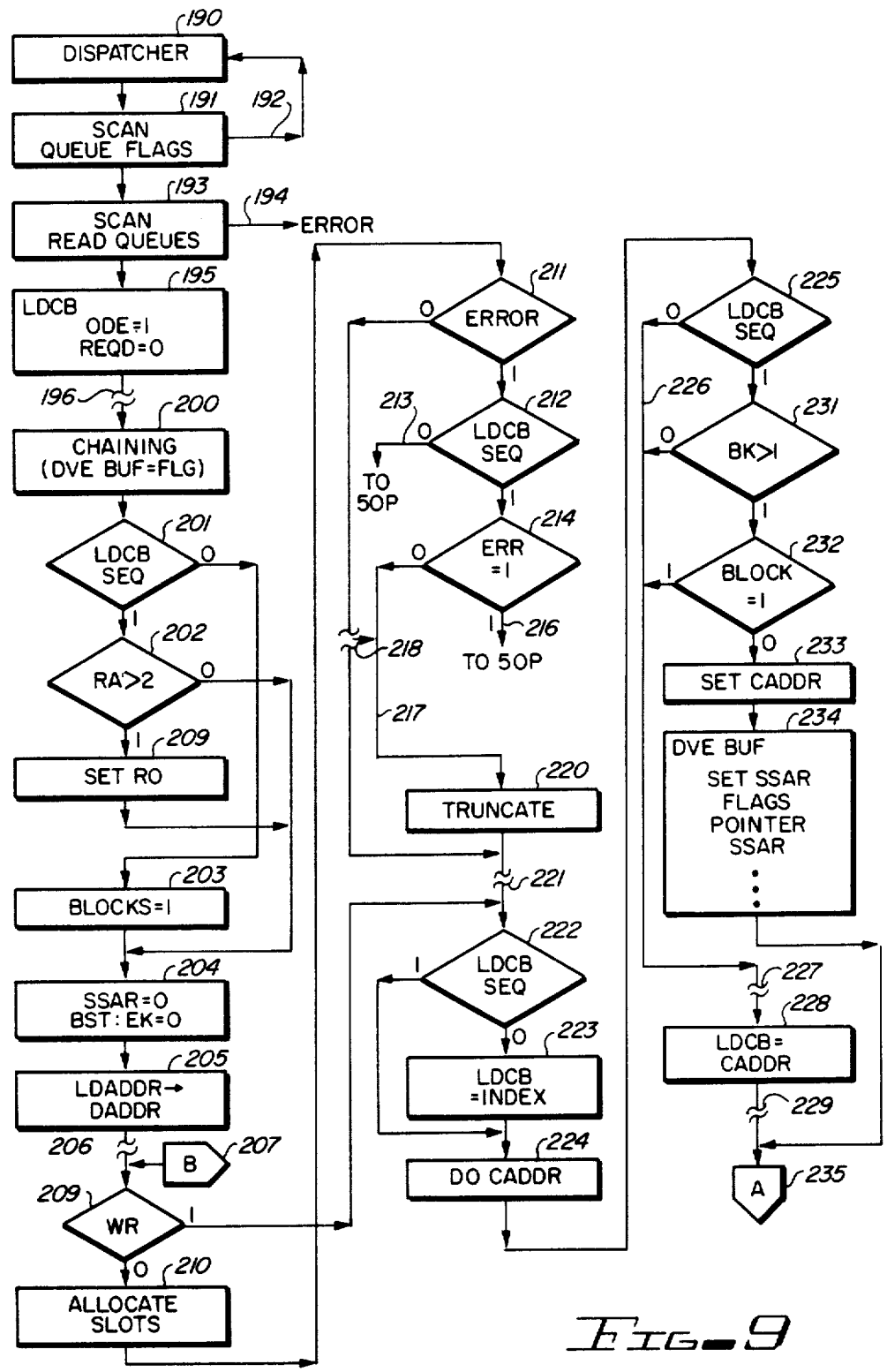
FIGS. 9 and 10 jointly show a machine-operations chart related to the promotion of sequential data from a backing store to a front or cache store including preparatory portions and internal command word portions in the FIGS. 1 and 2 illustrated data storage system.
Figure 10:
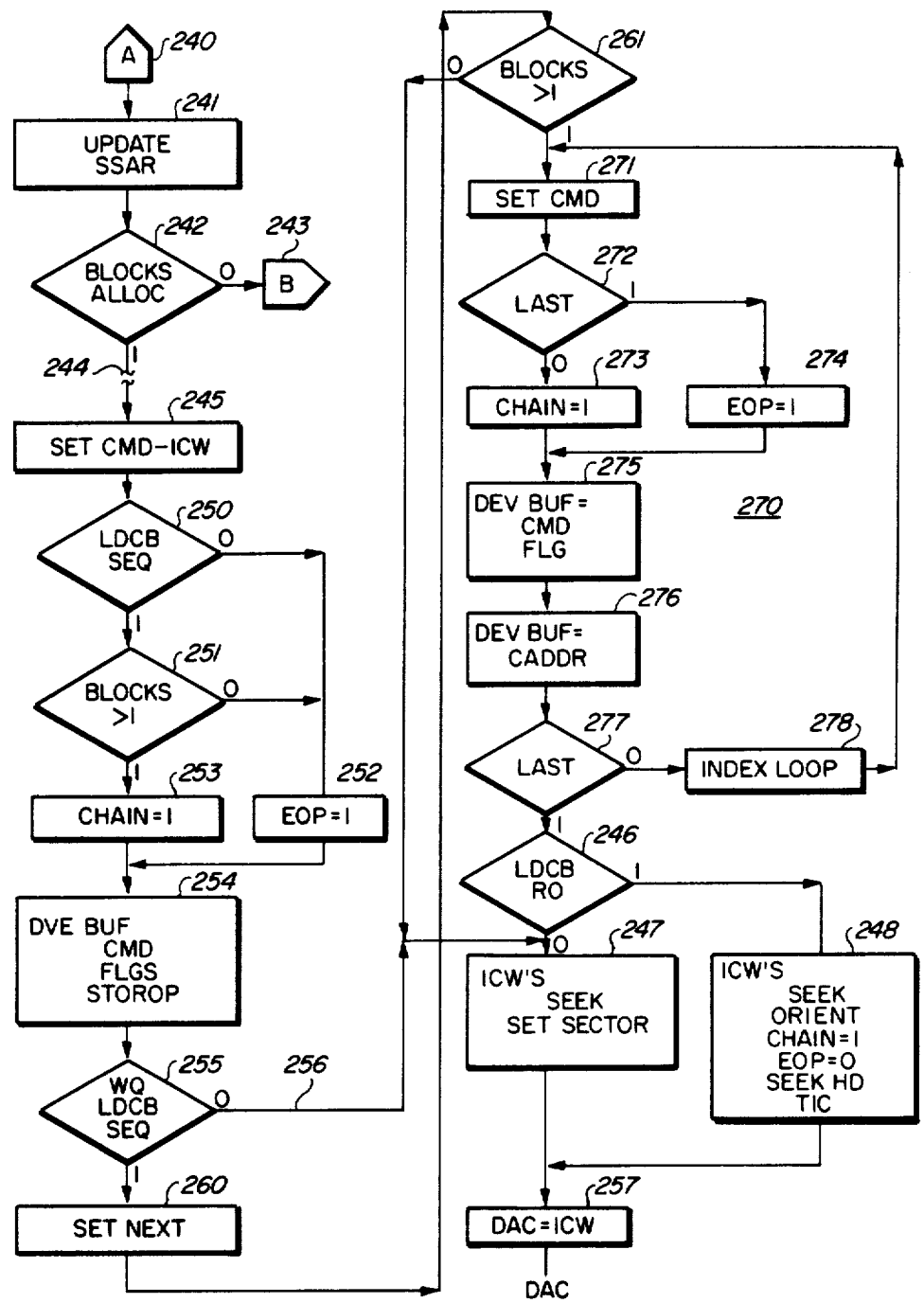

FIGS. 9 and 10 illustrate scanning the read queues 86 (FIG. 3) and generating an ICW chain of internal system 10 commands, all by CAC 61P. After the requested read has been enqueued, processor 31P causes system 10 to perform diverse functions, such as responding to commands received over various ones of the channel adaptors or additional commands received from the channel adaptor which had transferred the read command (which was CCR'd). When there is a lull in receipt of peripheral commands from the host, seek and set sector device commands are sent to an addressed device 16–18. When there is a lull in control activity which may occur while cache 40 is transferring data to host 11, receiving data from host 11, transferring or receiving data from an addressed device 16–18, processor 31P through its dispatcher microcode, which is a portion of OP 75 (FIG. 2) scans its work tables, including queue registers 69. If the queues are empty, i.e. no reading is to occur, processor 31P follows logic path 192 returning to dispatcher 190. If a read has been enqueued as detected at 191 by scanning the queue 86, the queue entry identifying the LDCB is transferred from the queue at 193 to an internal register (not shown) of processor 31P. If an error occurs in this transfer, an error reporting and recovery technique is instituted at 194. Upon successful reading the queue entry from queue register 69, LDCB 62 is accessed at 195 to set ODE section 90 to unity to indicate that a DEVICE END is owed upon completion of a successful read (such as indicated in FIG. 4 by arrow 150). REQD 110 of RPARMS 83 is also set to zero. At 196 some nonpertinent functions are performed. Then at 200, in the device buffer area 77 corresponding to the addressed device, a bit is set to indicate that logical chaining will occur, i.e., more than one ICW will be used in the upcoming access to the addressed device 16–18. At 201, LDCB 62 is again accessed to examine the value of SEQ 100. For sequential data being indicated, processor 31P proceeds to step 202 to examine the block count (B count 102) for the upcoming ICW chain. By arbitrary selection, only when the number of blocks to be transferred is greater than two, a roll mode operation is employed in the data transfer (read or write). It is preferred that the first track being accessed has the storage areas for at least three of the records to be transferred. Roll mode is indicated at 209 by processor 31P setting RO 99 (FIG. 3, PPARMS 81) to unity.

In the present embodiment, a maximum number of blocks which can be transferred through a given ICW chain is equal to the number of SSARs 79 or the SSARs could be reloaded as needed. For example, for eight SSARs the number of blocks transferred will be a maximum of eight. Further, delay boundaries are a consideration, for example, if the eight blocks to be transferred require accessing two cylinders; then only those blocks in the first cylinder will be transferred. For example, if the eight blocks have four blocks in a first cylinder and four blocks in a second cylinder, then the number of blocks would be set to four. This action minimizes the time required to transfer a series of blocks and enables all transfers to proceed to completion at electronic speeds. In the event of a miss on the first block of a given cylinder, then up to eight blocks could be automatically transferred. Also the maximum number of blocks is never greater than the remaining value in B COUNT 102. The ICW chains are constructed such that cylinder boundaries are never crossed by any given ICW chain. These calculations follow usual computer programming techniques and are not described for that reason. If sequential data is not indicated at 201, then the number of blocks to be transferred is set to one at 203. These numbers are supplied to the device buffer 77 along with the chaining flag, device addresses and other device control data. At 204, the SSAR 79 identification is set to 0. This means that processor 31P will access the SSAR having identification 0.

At 205, the logical address LDADDR including AC and DEV from CCW 19 of FIG. 1 is converted to a physical device address. In the illustrated embodiment, this action is achieved by merely masking the AC portion from the logical address. Certain nonpertinent functions are performed at 206. Point 207 is reentry point B from a continuation of the logic flow diagram described with respect to FIG. 10, i.e. all of the logic steps from 190 through 206 are preparatory steps. At 209, processor 31P examines the current ICW command 26 to determine if the current operation is a read from or a write to the addressed device 16–18. For a write operation, processor 31P proceeds directly to later-described step 222. For a read operation, the next-described operation being repeatable as a loop for setting up a succession of block read transfers.

The first step 210 in the loop allocates a slot or space in cache 40. Usual allocation procedures are followed, i.e. an addressable unit (slot) on a so called free list (not shown) is identified as the one to receive the first block of signals from the addressed device 16–18. That slot is then removed from the free list and identified within an internal register (not shown) within processor 31P for identifying which directory 43 entry is to be used for identifying the slot in cache 40. Note that there is one entry register in directory 43 for each addressable slot in cache 40. Accordingly, the actual address in cache 40 of the data can be derived directly from which register of directory 43 contains the entry. Upon the attempted allocation of a slot in step 210, processor 31P at 211 determines whether or not any error occurred in the allocation process. If an error has occurred, the total number of blocks may not be successfully transferred from the addressed device 16–18 to cache 40. Accordingly, for an error condition, at 212 processor 31P examines LDCB 62 SEQ 100 to determine if the data transfer is a sequential transfer. If it is not a sequential transfer, processor 31P follows logic path 213 returning to ACE 50P to wait for a replacement algorithm control to make space available for one block. For a sequential transfer, when processor 31P at 214 determines the error occurred on the first block to be transferred, processor 31P returns via logic path 216 to ACE 50P. If the allocation error is not for the first block, then data transfers of the allocated blocks occur. Processor 31P follows path 217 to 220 for truncating the number of blocks to be transferred in the unallocated area from the ICW list.

Returning to step 211, if there were no allocation errors, then at 218 some nonpertinent functions are performed. These functions include analyzing microcode logic errors not related to allocation. If a slot was not allocated due to such microcode errors, then the truncate step 220 is also performed for reducing the number of blocks transferred from the addressed device 16–18 to cache 40. Without an error or after truncation, processor 31P performs some nonpertinent logic steps at 221 which may include returning to ACE 50P for performing certain housekeeping functions. At 222, LDCB 62 SEQ 100 is examined. If SEQ is 0, i.e. nonsequential data, then at 223 the index of the directory 43 entry corresponding to the slot in cache 40 to receive the data is entered into LDCB 62 section 114 of RPARMS 83. For sequential data or after the index is entered into LDCB 62, at 224 the cache address to be inserted later into an SSAR 79 is generated from the directory index just inserted into LDCB 62. This generation is merely adding an offset to each of the directory indices. Then at 225, LDCB 62 SEQ 100 indicating sequential mode causes processor 31P to examine B COUNT 102 to see if the count is greater than one. If the count is greater than 1, then at 232 processor 31P examines to see if the first block in the sequence of blocks being transferred is being handled. If not, at 233 a new cache address for the second block is provided. Then at 234 in the device buffer area 77, ICWs are built that will cause the SSAR 79 corresponding to the second or other blocks to be set to the cache address, flags are set, pointer to the directory 43 is set and the SSAR 79 to receive the cache address is identified. Other functions to be performed may also be defined in the device buffer 77.

Returning to steps 225, 231 and 232, the logic path 226 leads to nonpertinent steps 227 followed by processor 31P accessing LDCB 62 at 228 to store the generated cache address in section 118 of RPARMS 83. Then following nonpertinent steps 229, processor 31P proceeds through connector 235 to the logic steps shown in FIG. 10.

The program connection between FIGS. 9 and 10 is through connector A denominated by numerals 235 and 240, respectively. At 241 processor 31P updates the pointer to SSAR 79 by incrementing EK 121 of FIG. 3. At 242 processor 31P determines whether or not all of the blocks to be transferred to cache 40 have received allocations in cache 40. If not, through connector B 243 processor 31P returns to FIG. 7 flow chart at B 207 to allocate cache 40 space for another block. This loop is repeated until EK 121 contains a count equal to the number of blocks to be transferred (not more than eight).

After completing the loop, some nonpertinent logic steps are performed at 244. At 245, the read code command (or a write command for write sequential) is set into the ICW representing a read data command (write command) for DASD 16–18. At 250, for a read operation LDCB 62 is accessed to determine whether or not the sequential data flag SEQ 100 in PPARMS 81 is set to unity or reset to zero and WQ 85 to determine if a roll mode flag (not shown) is set or reset. When either the sequential or roll mode flag is set, processor 31P at 251 determines whether or not the received block count is greater than 1. If it is greater than 1, then a chaining indication is set in command modifier byte 27 of ICW 24 (FIG. 1); otherwise from steps 250 or 251 the end of chain indication EOC is indicated in byte 27 by resetting the chain indicator. At 254 the device buffer 77 in control store 73 receives the ICW, i.e. the code permutation flags and other storage operation (STOROP) indications. At 255, processor 31P again examines SEQ 100 of LDCB 62 for nonsequential, i.e. SEQ=0. For nonsequential data transfers, processor 31P follows logic path 256 to execute logic step 247 for completing the just-constructed ICW; then at 257, transmits the ICW chain to DAC 56P via LKP 25.

For a sequential data transfer, processor 31P leaves step 255 to execute logic step 260 for adjusting EK 121 (another register (not shown) in processor 31P having counter contents initially set to zero at step 244 is easily used) to identify the next entry (set next). Then at 261, if the remaining block count is not greater than 1 then the ICW chain is completed, as later described, at 247 and transmitted to DAC 56 in step 257. For a number of blocks remaining greater than 1, loop 270 is executed for setting up the remaining ICWs for a chain of such ICWs. At 271 the command is set for read count, key, data, write and multi-track commands. At 272 processor 31P determines whether or not the last block in a sequential group of blocks is being processed. If not, the chaining flag in byte 27 of the ICW being built is set to unity. Otherwise at 274 the end of chaining condition is indicated by resetting the chaining flag and setting EOC flag within ICW 24. At 275 the ICW is transferred to the device buffer 77. At 276 the cache address is stored in the device buffer such that it can be transferred immediately to SSAR 79 for the burst transfer. At 277 processor 31P determines if the block is the last block; if not, the loop is indexed at 278 adjusting a count in an internal register (not shown) using usual control techniques. When the loop is indexed at 278 the steps 271 through 277 are again performed. Completion of loop 270 finds processor 31P at 246 examining roll-mode indicator RO 99 (FIG. 3) to determine whether the ICW chain should initiate a roll mode or use another access technique. The first two commands in the chain determine the access technique. At 247 the first two ICWs are a SEEK and SET SECTOR ICWs which are identical to CCWs for a DASD data storage system. For the roll mode (RO=1 at 246), step 248 shows an identical SEEK ICW followed by the ORIENT ICW (previously described). At this time, DAC 56P knows where in the chain of commands to begin data transfers. Also, all chain indications in byte 27 (FIG. 1) are set to unity, EOP is reset and a TIC (transfer in channel) ICW identical to a usual TIC CCW is set at the end of its ICW chain for moving machine operations toward its head of the ICW chain as shown in FIG. 11.

DAC 56P upon receiving the ICW chain executes the chain in the same manner that it executes received commands through channel adaptors 32. Since this latter operation is well known, the execution of the ICW chains is not further described. It should be noted that in transferring signals from DASD 16 to cache 40, DAC 56P not only provides the addressing to DASD 16 but also transfers the cache address contents of device buffer 77 into SSAR 79 such that several blocks of data can be transferred in a single data stream. Upon completion of that transfer, DAC 56P loads the resulting status, including error indications, into LKP 25. Processor 31P operation then switches from DAC 56P to CAC 61P.

FIG. 11 illustrates an ICW chain of commands for effecting a roll mode in the illustrated apparatus. Chain of commands 400 is initiated as indicated by arrow 401 which corresponds to step 257 of FIG. 10. FIG. 12 is a time oriented machine operations chart described in conjunction with the FIG. 11 illustrated chain of commands. Chain 400 is logically divided into three major sections, X, Y and Z, which represent execution of chain 400 in the time domain. Portion X is a preparatory step which includes a cylinder SEEK at 403 for aligning heads 340 (FIG. 5) at the radius defining a desired cylinder 334 of tracks. The SEEK step is performed by DAC 56P in a series of steps 425. A first step reads LKP 25 at position 1 (LKP1) in step 426. This step transfers the ICW bit pattern from LKP 25 into DAC 56P for execution in the same manner as a CCW is executed. At 427, counter LKPK in table 84 (FIG. 3) is incremented for preparing reading the second ICW. At 403, the actual SEEK to the cylinder 334 of tracks is executed. During execution of the SEEK by the addressed DASD 16-18, processor 31P goes into a wait loop or performs other functions not pertinent to this disruption while awaiting the completion of the SEEK operation. At 430 whether or not a SEEK completion signal from the addressed DASD 16-18 has been received over line 355 (FIG. 5) is checked. A timeout TO (not shown) is checked at 433. If there has not been a timeout, there is no error condition; hence, path 435 is followed to repeat step 430. For a timeout, an ERP (Error Recovery Procedure) is initiated at 434. Upon completion of the SEEK at 440, processor 31P in executing DAC 56P reads LKP 25 at position LKPK. This read transfers the ORIENT ICW 404 from the LKP 25 area to DAC 56P for execution. At 441 LKPK is incremented by unity. At 402 the just received ORIENT ICW 404 is executed as detailed in FIG. 13. Execution of ICW 404 establishes rotational synchronization with DASD 16-18 and enables processor 31P to select an ICW to begin portion Y of chain 400. That is, in scanning the record track which contains the first records to be transmitted, the rotational position is identified. Processor 31P takes the identified rotational position and selects the immediately following record which will pass under the appropriate transducer 340 for the first ICW to be executed in chain 400, irrespective of its logical position in the chain. For a write or recording operation, for ensuring data integrity, it may be desirable to skip the first-encountered record area. Referring back to FIG. 6, in mode 1, rotational synchronization is established for track 363 when the appropriate head 340 is scanning track 363. For example, in the R2 area after its address mark 335 has passed its transducer 340. As soon as a record identification or sync 335 for record R3 is encountered, sync is established; the data relating to the record R3 area of track 363 is transferred. Before record R3 is encountered, control data relating to the record R3 area of track 363 is transferred to cache 40. In FIG. 12, the first data transfer ICW 412 is then executed. The following ICWs indicated within section Y identified data areas arbitrarily enumerated D-H are transferred in sequence as described with respect to FIG. 6. The ORIENT ICW 404 not only sets up for the data transfer at 412 but also sets an EOP flag in the ICW 411 which is in the SIDE C ICW for the data represented as the C block of data being transferred. In mode 1, this corresponds to the SIDE command preceding the data transfer for record R3 in track 363. In other words, the search identification preparatory step for a data transfer in DASD is selected as the ICW for terminating the execution of chain 400 after the final data transfer by using EOP of byte 27 as shown in FIG. 1 and as explained later with respect to FIG. 14. At the same time as indicated by arrow 410, the SSAR 79 address for a eight-SSAR embodiment is set to receive the third set of data. That is, the SSARs 79 are addressable by numerals 0-7. When the third record is the first record to be transferred, then SSAR 79 addressed by numeral 2 provides the first address of cache 40. The SSAR 79 addresses are automatically incremented each time a block of data is transferred in a round-robin fashion such that following SSAR 7 providing this address for data block H of chain 400, data block A is then addressed in cache 40 through SSAR 79 address 0. When less than eight blocks of data are being transferred in the roll mode, the later described SEEK HEAD command results in presetting SSAR ICW (not shown) for directing the data block to A. The described procedure may be modified for read operations. The SSARs 79 are preset with cache 40 addresses in any arbitrary sequence. The multiple-record read data transfer occurs. Subsequent to the data transfer, the sequentiality of the records are established based on the known DASD addresses of such data. This latter procedure is preferred for read operations as the elapsed time between an address mark 335 and the actual beginning of a record area can be minimal.

Figure 15:
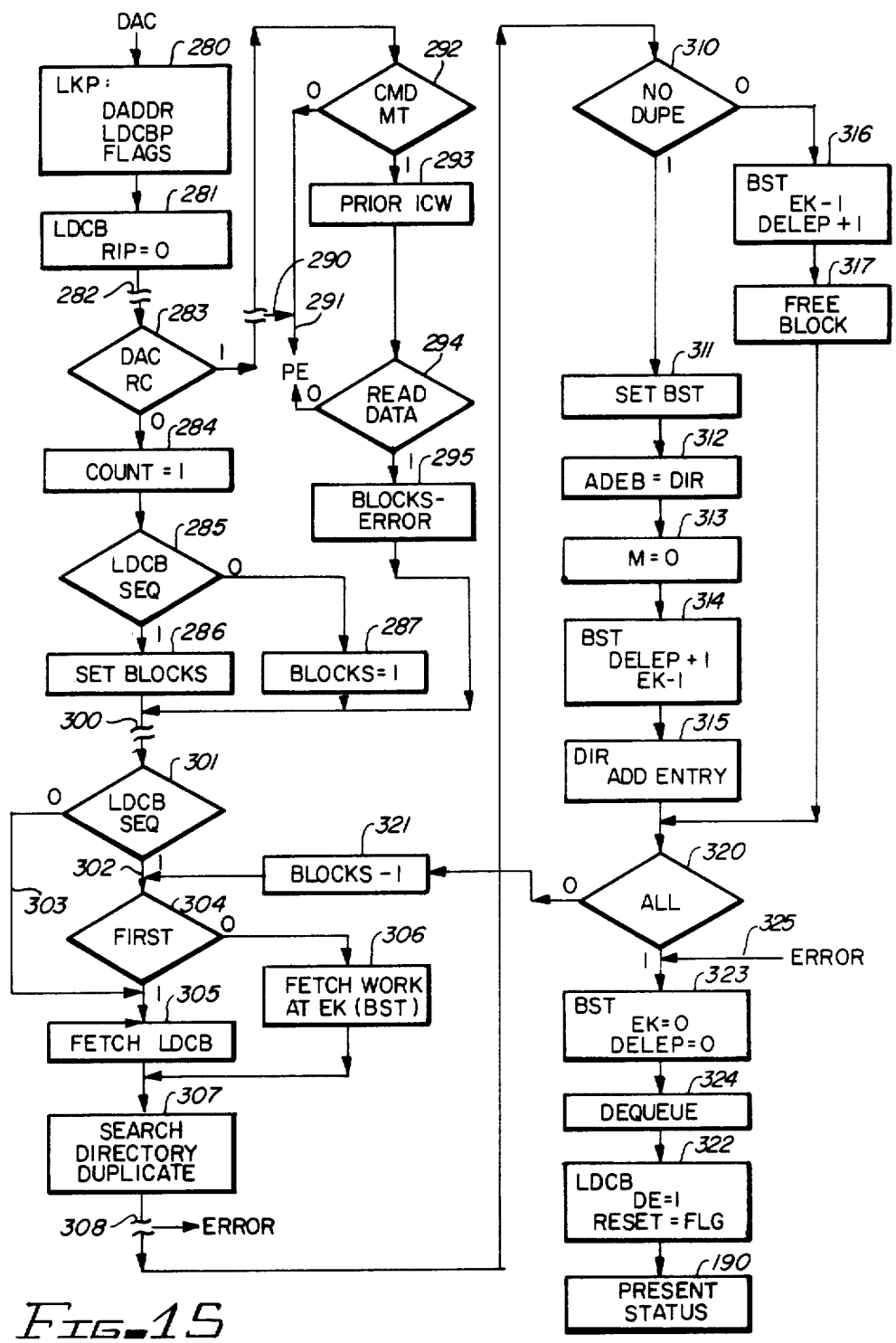
FIG. 15 is a logic flow chart showing post data-promotion processing for large sequential data sets in connection with practicing the present invention in the FIGS. 1 and 2 illustrated data storage system.

Returning now to FIG. 11, the Y portion of the ICW chain 400 is completed by a data transfer at 414, which transfers the last identified block of data in the chain 400. Following this ICW, a SEEK HEAD ICW 415 causes the switching circuit system 343 to switch back to track T1, such SEEK HEAD commands are well known and not further described for that reason. Following the SEEK HEAD ICW 415, a transfer in channel TIC ICW 416 causes execution of the chain 400 to follow logic path 417 back to SIDE A ICW 418. This is achieved by setting LKPK to three, causing the third ICW SIDE A 418 to be read from LKP 25. Then the Z portion is executed in sequence in a usual manner. After the SIDE C ICW 411 is exceuted, the return code RC is set into LKP 25 at 443. Then host processing functions are provided by CAC 61P as shown in FIG. 15. A multi-record transfer can also be achieved by the read multiple count key and data command of the 3830 and 3880 type IBM storage controls for reading most of the data stored in a track of data with one command; that is, beginning with a record first encountered on a track, all records between the first encountered record and index are read by one CCW.

In summary, the ORIENT ICW 404 causes an effective jump to record RN as indicated by logic path 407, which can be in the center or in any position within the chain 400 but always in the preferred embodiment to a record within the first track following an initial cache miss as at 374 of FIG. 6. Following initiation of the Y portion of execution of chain 400 index 370 in a multi-track operation causes an automatic track switch at position 413 in chain 400, such that the next track 364 (FIG. 6) is then accessed for the ensuing data transfers. Upon completion of the "Y" portion of the chain 400, a transferring channel command (similar to a transferring channel in a host processor) causes execution of a first portion of the chain of commands to be performed as described.

The above description refers to early rotational synchronization. As mentioned, this is not an absolute necessity as described for mode 2. To achieve mode 2, SEEK HEAD commands are located within chain 400 such as collectively indicated by numeral 420. Examination of table 84 with respect to the number of records being transferred in tracks T1-T3, the number of records transferred as indicated in sections RK1-RK3 and the present track being accessed TK allows a microcode program to be constructed for implementing mode 2. Since the relationship is purely arithmetic and this mode is not the preferred mode, it is not further described, the arithmetic portion is easily ascertainable from the addressing structure of the tracks and the illustrations in FIG. 11.

Figures 13, 14:
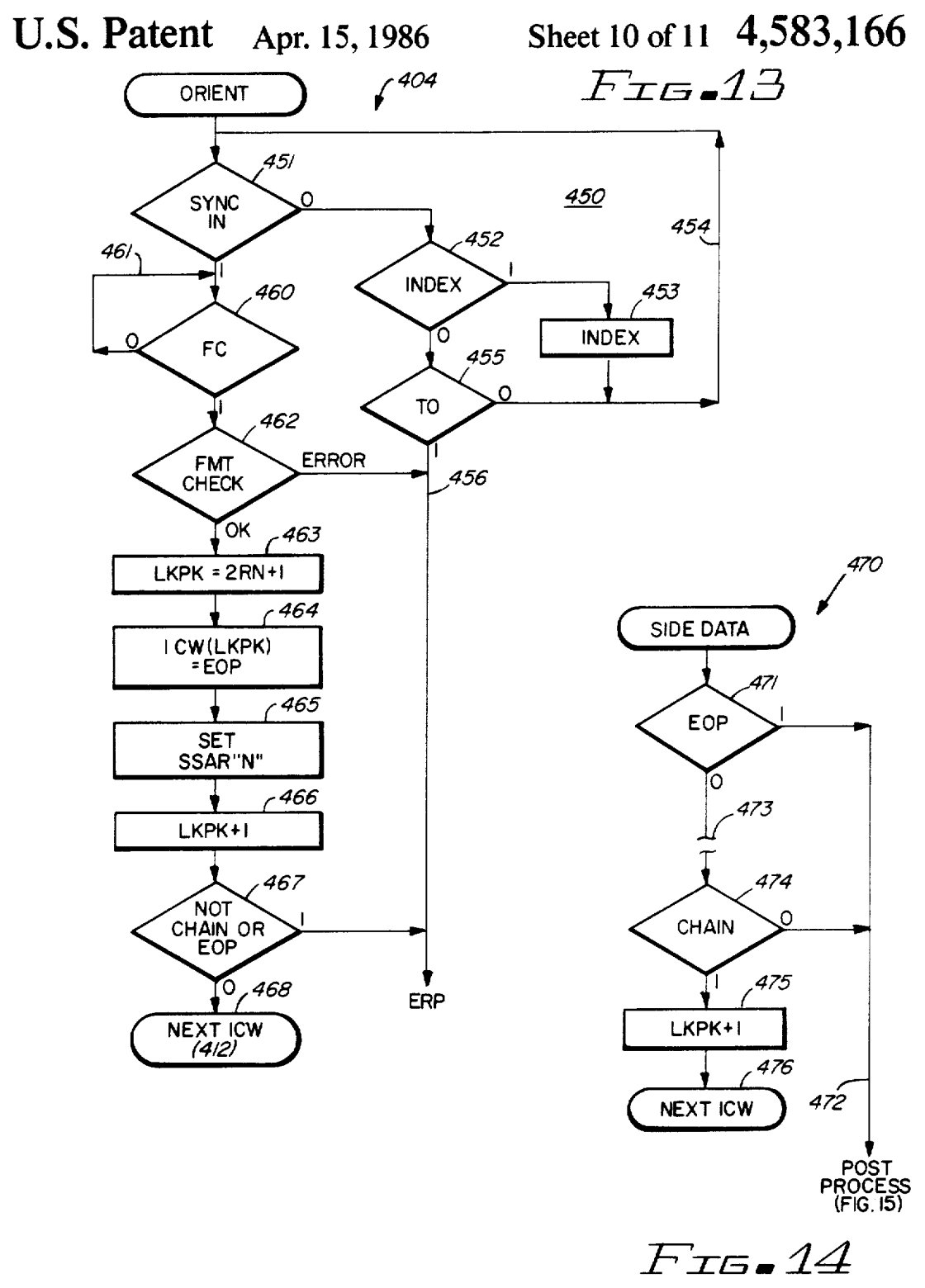

The ORIENT ICW is the ICW distinguishing roll mode accessing from latency delay accessing. FIG. 13 shows execution of the ORIENT ICW 404 at 451 sync in signal provided by pattern detector 345 (FIG. 5) is checked for. If while waiting for sync in, a short latency delay compared to a possible maximal latency delay equal to the rotational period of the DASD, index is checked at 452. Since track switching is to be inhibited an index routine (not described) 453 is executed. Then WAIT LOOP 450 is completed by following logic path 454 back to step 451. When index is not being detected at 452, a time out is checked at 455. For a time out an error condition is indicated with an ERP being initiated as indicated by numeral 456, otherwise loop 450 is continued. A sync-in field-complete signal from line 347 (FIG. 5) is awaited for by step 460 and as indicated by wait loop 461. The field-complete signal indicates that a record identification signal has been read from DASD 16-18 into the control 31. Receipt of the field-complete signal (FC) indicates that a signal gap (not shown) is being scanned in the record track allowing processor 31P to do a format check at 462. An error causes an ERP to be initiated at 456. Otherwise, at 463, the record number on the track (R1-R8) is used to calculate at 463 the intial value of LKPK of table 84. This calculation, for mode 1, doubles the record number and adds unity. Returning to FIG. 11, it is seen that two ICWs are used for each record to be transferred, hence the record number for fetching the ICW must be doubled. A SIDE ICW need not be used for each data transfer, instead the known READ COUNT KEY DATA command may be used in lieu of the two commands and the calculations adjusted accordingly. Further because of section X, unity is added to reach the data transfer ICW and avoid the SIDE ICW. Since the record numbers begin with numeral 1 rather than numeral 0, the X portion is taken outside of the arithmetic calculation. Following the identification of the ICW in terms of LKP 25 addresses at 463, processor 31P within DAC 56P at 464 accesses the ICW at LKPK which is ICW 411 in FIG. 11. EOP in its byte 27 (FIG. 1) is set to unity for signifying end of processing (EOP). At 465, the SSAR 79 address is set. At 466, LKPK is incremented by one for fetching the data ICW 412. In the illustrated operation, the data acess command is a READ command, it can be a WRITE command as well. Then at 467, processor 31P examines the byte of the ICW just fetched to see if the chain bit is set to unity and the EOP bit is set to zero. When these conditions are not met, an ERP is entered because of an error condition. Otherwise, at 468 the next ICW is fetched for executing portion Y of chain 400.

FIG. 14 is a simplified drawing showing execution of the side commands and the data access commands in a roll mode chain 400. This simplified procedure 470 shows checking for EOP at 471. If EOP occurs, host processing of FIG. 15 is entered via logic path 472. Note EOP is checked before execution of the command for saving control unit time, i.e., in the roll mode, one of the ICWs is never executed because of the manner in which the ORIENT ICW is executed. Following checking for EOP, the command is executed as indicated by numeral 473. Following completion of the ICW execution at 474, the chaining bit of byte 27 (FIG. 1) is examined. If completion of the chain is indicated, then host processing is followed at FIG. 15. If chaining is indicated, then LKPK of table 84 is incremented by one at 475 for enabling accessing the next ICW as indicated by numeral 476. The execution of ICWs as indicated in FIG. 14 allows both roll mode and non-roll mode execution of the same ICW, i.e., duplicate code need not be provided for roll mode operations, hence saving control memory.

FIG. 15 illustrates the portion of CAC 61P called post processing, i.e. logic steps performed following the transfer of data signals from DASD 16 to cache 40. First the contents of LKP 25 are transferred to work registers at step 280. This includes the device address, the pointer to LDCB 62 and any flags that may be generated by DAC 56P. At 281, processor 31P accesses LDCB 62 for resetting RIP 111 to 0 for indicating that no read from a DASD is in progress. At 282 some nonpertinent logic steps are performed. At 283 processor 31P examines the DAC 56P return code (RC) for an error free condition; for a successful transfer of all requested blocks of data to cache 40 a return code of 0 is provided. For such a successful operation, the contents of an internal work register of processor 31P is set to unity at 284. This initializes the count. At 285, LDCB 62 is accessed for examining SEQ 100. If the transfer is not sequential, i.e. only one data block is to be transferred, then the number of blocks being transferred is set to unity at 287. Otherwise at 286 the number of blocks allocated as stored in device buffer 77 is transferred to EK 121 to indicate the number of entries in BST 78.

For an error condition at step 283, i.e. RC does not equal 0, an error analysis set of logic steps are performed at 290. If a permanent error is indicated by such analysis, processor 31P follows path 291 to a permanent error recovery and reporting procedure beyond the scope of the present description. Otherwise at 292, processor 31P determines whether or not the command was a multi-block transfer command, i.e. more than one block of data was to be automatically transferred. If not, an error condition would effect a single block, therefore a permanent error has to be handled causing processor 31P to follow logic path 291. If a plurality of blocks were transferred, then further action can occur, i.e. one block may be in error while all of the preceding blocks were transferred error free. DAC 56P has identified via LKP 25 which block caused the error. CAC 61P from the DAC 56P information can identify which ICW is associated with the error. Processor 31P then fetches the immediately preceding ICW at 293 from device buffer 77. At 295, if the command was for reading data from DASD 16 to cache 40, processor 31P at 295 adjusts the block count by subtracting the number of blocks in error from the slots allocated. At 294 for a command in error other than a read data command, the error occurred before any data transfer; processor 31P goes to a permanent error routine (not described). From steps 286, 287 or 295, some nonpertinent logic steps are performed at 300. Such logic steps pertain to internal addressing, not pertinent to an understanding of the present invention. At 301, processor 31P accesses LDCB 62 SEQ 100 to determine whether or not a sequential transfer is indicated. For a sequential transfer logic path 302 is followed to step 304 to determine whether or not the block transferred was the first block. For the first block being transferred in a sequence of blocks or in a nonsequential mode, wherein only one block is transferred, processor 31P at 305 transfers the contents of LDCB 62 to a work register (not shown) for the ensuing logic steps. This includes transferring the logical cylinder indication CCL (see 108), record number R, the logical device address D and other control data not pertinent to an understanding of the invention. For blocks which are not the first block, processor 31P at 306 accesses BST 78 (FIG. 3) to obtain the directory index for that block as indicated by DELEP 121. For the first block or nonsequential data, directory 43 index 114 of LDCB provides the same information.

For the directory 43 search, processor 31P at 307 looks for the cache address corresponding to the device address. This search includes a hashing operation to determine whether or not the directory 43 has an entry corresponding to the block of data just transferred from DASD 16 to cache 40. Remember that several parallel accesses to the same DASD 16 are possible in an asynchronous manner; therefore it is important that one and only one replication of DASD 16 data be in cache 40. This requirement provides data integrity, i.e. if duplicate copies were in cache 40, one copy could be updated while a second copy could be erroneous. Then the updated copy could be stored in DASD 16, that entry being erased; later access by a host to the system 10 could result in the erroneous data residing in cache being sent to the host via channel adaptor 32.

Following a search, error indications are checked at 308. For no errors, at 310 processor 31P determines whether or not a duplicate copy was found. For no duplicate at 311, the BST 78 entry is calculated, i.e. the DELEP 120 value, BST 78 is accessed for pointing to the directory index (numerals 122-123 of FIG. 3) such that the directory 43 entry corresponding to the DASD 16 address is transferred from directory 43 to ADEB 76 for convenient access by processor 31P, all action occurring at 312. At 313 processor 31P resets M 269 in ADEB 76. M indicates modified data in cache 40. Resetting M to 0 indicates that the copy in cache 40 is identical to the copy on DASD 16. At 314, BST 78 is again accessed for incrementing DELEP 120 and decrementing EK 121. At 315 a directory 43 entry is added corresponding to the data just transferred to cache 40; that is, when DAC 56P caused the block of data to be transferred to cache 40, directory 43 had not yet been updated, i.e. the data in cache 40 is not yet addressable. By creating a directory entry in the usual manner at 315, the just-transferred data from DASD 16-18 to cache 40 becomes addressable.

On the other hand, if a duplicate is found at 310, it is assumed that the data already in cache 40 is the correct copy, i.e. it may have been modified. Therefore, it is desired not to make the just-transferred data block addressable and to proceed to the next data block. At 316 BST 78 is accessed for decrementing EK and incrementing DELEP. The block just transferred is freed at 317 leaving only a single copy of the data in cache 40. Freeing the block makes it nonaddressable.

The final housekeeping logic functions occur beginning with step 320 determining whether or not all of the data blocks transferred from DASD 16 to cache 40 have been post processed. If not, at 321 the number of blocks to be post processed is decremented by 1. Processor 31P then follows logic path 302 to execute a loop including steps 304 through 315.

At 323 BST 78 is accessed for resetting EK and DELEP to 0. Step 323 is also entered from logic path 291 via logic path 325. At 324, queue registers 69 are accessed for removing the queue entry from the queue such that a duplicate read will not occur. You will recall that in FIG. 8 the read was enqueued at 164. Then at 322 LDCB 62 is accessed for resetting control flags, such as CCR 95, miss 96, RA 112 and the like and for posting a device end, such as by setting ODE 90. At 190 status is presented to the host via ACE 50P. In all of the above description it should be noted that the transfer of data signals from DASD 16 to cache 40 and in the reverse direction is on an asynchronous basis with respect to the operation of the channel adaptors 32. Under certain circumstances, a request from the host through channel adaptor 32 can take priority over the transfer, therefore some of the just-described operations may be interleaved with higher priority operations. Since multiprocessing is well known this detail is not further discussed.

While the invention has been particularly shown and described with reference to preferred embodiments thereof, it will be understood by those skilled in the art that various changes in form and details may be made therein without departing from the spirit and scope of the invention:

What is claimed is:

1. A data-storage system adapted to be connected to a host processor and having a high-speed data cache and slow-speed backing store, means for transferring data signals between said data cache and backing store, said cache and store each having a large plurality of addressable data storage registers, said backing store including a disk storage apparatus having a plurality of recording surfaces with a transducer head for each of the surfaces with one track of each surface being scanned by a respective transducer at a given instant, such tracks constituting a cylinder of data tracks, said apparatus having means for indicating rotational position of the data stored on the tracks with respect to said transducers;

the improvement comprising:

first means for receiving from said host and memorizing an intent signal signifying sequential data blocks and a storage extend for storing such blocks;

data-transfer means for transferring data signals between said host and said cache and memorizing that blocks of data signals defined by said intent signal were transferred with the host;

second means connected to said data-transfer means and being connectable to said host for receiving peripheral commands from said host and responsive to said intent signal and a request for any of said sequential blocks to actuate said data-transfer means for transferring data signals between said backing store and said data cache within all of such identified sequential blocks up to a predetermined maximum number of such identified sequential blocks; and means in said data-transfer means including internal command word (hereinafter termed ICW) chain means for establishing a series of commands for accessing predetermined ones of said blocks stored in tracks within one of said cylinders of data and arranging said commands into a chain of commands for transferring said predetermined ones of said blocks in a predetermined sequence; means for sensing the instant rotational position of said tracks of a first encountered block with respect to said heads and determining the rotational position of said first encountered block; means coupled to said sensing means and said ICW chain means for selecting a command in said chain of commands irrespective of its position in said sequence as the first command to be executed in accordance with the comparison of said rotational position and said expected rotational position of said predetermined ones of said blocks; and means coupled to said selecting means for executing the chain of commands beginning with said rotationally selected command through the end of the chain, thence to the beginning of the chain and to the command in said sequence that immediately precedes said rotationally selected command whereby a plurality of records within said cylinder on any of said tracks are accessed with a minimal latency delay due to rotation of said disk record surfaces.

2. The data-storage system set forth in claim 1 wherein said cache has a given number of address registers, each for containing an address of said addressable storage registers, and said predetermined maximum number equalling said given number.

3. The data-storage system set forth in claim 1 wherein said second means includes means for receiving a chain of said peripheral commands for performing a sequence of operations with respect to said slow-speed backing store; and control means operatively connected to said high-speed data cache for receiving predetermined ones of said chained peripheral commands from said second means and for generating a plurality of chained commands associated with said cache and said second means for initiating said data-transfer means for transferring data signals between said cache and backing store in a same general sequence as said host supplied chained peripheral commands and said second means interleaving said chained peripheral commands with said chained control means commands.

4. The data-storage system set forth in claim 1 further including a plurality of address registers operatively connected to said data cache and a one of said ICWs including means for indicating addresses for one of said plurality of cache address registers such that a plurality of said ICWs in a chain can cause a like plurality of data blocks to be inserted at any arbitrary location of said data cache when received in a rapid sequence from said backing store.

5. The machine-implemented method of performing a predetermined series of data-storage access operations listed in a given arithmetically progressing series of data storage addresses for successively addressed data-storage areas, each of said operations relating to a given data record in a series of a plurality of related data records having a plurality of related data signals; said data-storage areas being arranged in groups of N record areas; N is an integer, all of said groups exhibiting a given maximal periodic access latency for all data-storage areas therein;

including the machine-executable steps of:

examining the number of records to be transferred for a first group, if the number of records to be transferred is K or more (K is an integer less than N) then do the following steps;

examining a one of said groups with respect to a first number of not greater than N of said listed storage addresses for identifying a one of said listed storage addresses as a storage address related to a data-storage area of said one group as being a next-accessible data-storage area;

marking an arithmetically immediately-preceding one of said listed addresses as identifying a last-accessed one of said data-storage areas;

successively accessing said data-storage areas indicated by said listed addressing beginning with said next accessible data-storage area and continuing through a last one of said listed addresses through a plurality of said groups; and upon completion of said accessing, successively accessing the data-storage areas beginning with a data-storage area identified by the first-listed address and continuing through said data storage area identified by said immediately preceding listed address; and if the number of records to be transferred is less than K, accessing the data-storage areas as listed in said arithmetic progression.

6. The machine-implemented method set forth in claim 5 wherein said group of data-storage areas is a record track in a disk-storage apparatus and said disk-storage apparatus further having an enlarged group of said data-storage areas in a plurality of tracks on co-rotating record surfaces having a common radius and wherein said number N is the total number of data-storage areas in a track of records;

further including the machine-executable steps of:

limiting said successive accessing of data-storage areas to a number of said record tracks less than the total number of record tracks in said enlarged group and transferring all signals in said smaller number of record tracks irrespective of transferring data with said data cache irrespective of storage of such data in said cache such that predetermined records are retransmitted between said data cache and said disk-storage apparatus.

7. The machine-implemented method set forth in claim 6 wherein said disk-storage apparatus is coupled to said disk cache and said disk cache is a random-access buffer and wherein said disk-storage apparatus has an index point for each of said record tracks, further including the machine-executable steps of:

during said successive accessing of data-storage areas, synchronizing said data transfers to said index mark such that subsequent successive accessing of said data-storage areas are synchronized to said index mark without said retransmission.

8. In a peripheral data-storage system having a plurality of addressable direct access storage devices (DASD), each of said DASDs having a plurality of addressable cylinders and each cylinder having a plurality of addressable memory segments, a set of data-transfer heads in said DASDs for recording and reproducing stored data signals and positioned at a given circumferential position such that record tracks of the DASD are scanned thereby a high-speed buffer store having a plurality of buffer segments, each said buffer segment having a capacity equal to the capacity of said memory segments, means for attaching the data-storage system to a host;

means to receive peripheral commands from an attached host to transfer data with said DASD;

a digital processor having a control store for storing programs of instructions for operating the data-storage system;

signal means for transferring signals between said DASD, said buffer and said attached host;

the improvement comprising:

first program means stored in said control store for enabling said digital processor to operate the storage system to transfer one segment of data between said DASDs and said high-speed buffer store for each request for a segment data transfer received from said host;

second program means stored in said control store for enabling said digital processor to receive an indication from said host that a plurality of blocks of data are to be transferred and for indicating the extent of memory segments in one of said DASDs from which said plurality of blocks of data will be fetched, program means for decrementing the number of segments to be transferred to the host each time a segment is transferred to said host;

transfer program means stored in said control store for enabling said digital processor to operate said data-storage system upon receipt of a data-access command for a given segment contained within a memory segment defined within said extent to transfer blocks of data within said extent between said buffer and said one DASD;

chain program means stored in said control store for enabling said digital processor to establish a series of commands for accessing predetermined ones of said records in one of said cylinders and arranging said commands into a chain of commands having a predetermined sequence and storing same in the control store;

RPS means in said DASD and coupled to said digital processor for sensing the instant rotational position of said tracks with respect to said heads and comparing same with the expected location of the records stored on said tracks and coupled to said digital processor for supplying a signal indicating results of said comparing; and chain-execution program means stored in said control store for enabling said digital processor to select a command in said chain of commands stored in said control store irrespective of its logical position in a sequence of the commands in the chain as the first command to be executed in accordance with the comparison of said rotational position and expected location of said records, and having a program portion for enabling said digital processor to execute the chain of commands beginning with said rotationally-selected command through the end of the chain, thence to the beginning of the chain and thence to the command immediately preceding said rotationally-selected command whereby a plurality of records within said cylinder on any of said tracks are accessed with a minimal latency delay due to rotation of said disk record surfaces.

9. The peripheral data-storage system set forth in claim 8 further including program means stored in said control store for enabling the digital processor to operate the data-storage system to limit a sequence of data transfers between said DASD and said buffer store to segments stored in a given cylinder during any one sequence of segment transfers.

10. The peripheral data-storage system set forth in claim 9 further including a plurality of address registers in said buffer store arranged such that any one address register can address any of said buffer segments; and all of said program means stored in said control store enabling said digital processor to transfer a maximum of segments of data from a given number of memory segments equal to the number of said address registers.

11. The peripheral data-storage system set forth in claim 10 further including a program means stored in said control store for enabling said digital processor to separately enqueue a plurality of data transfers to be conducted with each of said addressable DASDs such that a plurality of immediately succeeding data transfers can be provided with any given DASD to the buffer store in an asynchronous manner with respect to said base.

12. The peripheral data-storage system set forth in claim 11 further including program means in said control store for enabling said processor to accept any one of a plurality of logical device addresses for each of said addressable DASDs such that each of said memory segments can be addressed through any one of a plurality of said logical addresses and enqueuing said data transfers for each said DASD in accordance with receipt through any of said logical addresses and further enabling access to each DASD via a fourth address for each of said DASDs, which fourth address enables bypass of said buffer store.

13. The machine-implemented method of accessing a plurality of records stored in a disk-storage apparatus having a plurality of recording surfaces with a transducer for each of the surfaces with one track of each surface being scanned by a respective transducer at a given instant and such one track constituting a cylinder of data tracks, said apparatus having means for indicating rotational position of the data stored on the tracks with respect to said transducers;

the machine-executable steps of:

establishing a series of commands for accessing predetermined ones of said records in a one of said cylinders and arranging said commands into a chain of commands having a predetermined sequence;

sensing the instant record of signals on said tracks with respect to said heads and determining the instant rotational position of said instant record stored on said track;

selecting a command in said chain of commands irrespective of its logical position in the sequence as the first command to be executed in accordance with the comparison of said instant rotational position and expected location of the records; and executing the chain of commands beginning with said rotationally-selected command through the end of the chain, thence to the beginning of the chain and to the command immediately preceding said rotationally selected command such that a plurality of records within said cylinder on any of said tracks are accessed with a minimal latency delay due to rotation of said disk record surfaces.

14. The machine-implemented method set forth in claim 13, further including the machine-executable steps of:

selecting a number of commands for each series of commands equal to the number of records in a track multiplied by the number of tracks plus two and during execution of said series of commands substituting a one of said additional two commands or another one of said commands in said series said another command being said command immediately preceding said rotationally-selected command.

15. The machine-implemented method set forth in claims 13 or 14 wherein there is a random access memory serving as a data buffer coupled to said disk-storage apparatus, said buffer selectively storing data also stored in said disk-storage apparatus for enhancing access to said also stored data, movement of data from said disk-storage apparatus to said data buffer being a staging operation, further including the machine-executable steps of:

when establishing a said series of commands identifying data stored on entire tracks wherein a first series of commands may cause staging of data from said disk-storage apparatus to said data buffer such that any subsequent series of commands are synchronized to the data contents of said tracks irrespective of the data contents of the data buffer.

16. The machine-implemented method set forth in claim 15 further including the machine-executable steps of:

when establishing said series of commands, examining the data stored in said data buffer with respect to the data to be staged from said disk-storage apparatus; when said data stored in said data buffer exceeds a predetermined portion of a given track data capacity, then staging data from said track to said data buffer without selecting a command irrespective of its logical position, rather executing said series of commands in the order of said predetermined sequence and eliminating that data from said series of commands which is already stored in said data buffer.

17. The machine-executable method of accessing addressable data-storage areas on a disk storage apparatus arranged in cylinders of tracks with all tracks in a given cylinder being at a common radius on a plurality of respective data-recording surfaces, including the machine-executable steps of:

seeking a plurality of transducers to said radial position;

identifying the present rotational position of said record in said track;

receiving a series of commands including identifications of data-storage areas to be accessed beginning with a given address associatable with predetermined tracks in said cylinder of tracks and proceeding in an address incrementing arithmetic progression to a data-storage area having a given predetermined address, all of said addresses being identifiable by rotational positions and tracks;

when identifying said rotational positions for a given track, selecting a data-storage area from said given track closest to said identified rotational position and selecting said data-storage area as a first data-storage area to be accessed and identifying an immediately preceding data-storage area as a last data-storage area to be accessed; and accessing said first data-storage area and subsequently arithmetically progressing addressable data-storage areas to the end of said series including accessing a track other than said given track and upon completion of said series, again accessing said given track for accessing the data storage area arithmetically preceding said first identified data-storage area through said immediately preceding identified data-storage area.

* * * * *